US007397593B2

(12) United States Patent
Murakami et al.

(10) Patent No.: US 7,397,593 B2
(45) Date of Patent: Jul. 8, 2008

(54) DEFORMABLE MIRROR

(75) Inventors: Kenzi Murakami, Hino (JP); Masahiro Nishio, Akiruno (JP)

(73) Assignee: Olympus Corporation, Tokyo (JP)

( * ) Notice: Subject to any disclaimer, the term of this patent is extended or adjusted under 35 U.S.C. 154(b) by 8 days.

(21) Appl. No.: 11/704,096

(22) Filed: Feb. 8, 2007

(65) Prior Publication Data
US 2007/0188897 A1 Aug. 16, 2007

(30) Foreign Application Priority Data
Feb. 16, 2006 (JP) ............... 2006-038818
Nov. 17, 2006 (JP) ............... 2006-311600

(51) Int. Cl.
*G02B 26/08* (2006.01)
(52) U.S. Cl. ................ 359/224; 359/295
(58) Field of Classification Search ......... 359/223–226, 359/290–291, 295, 846, 878, 849
See application file for complete search history.

(56) References Cited
U.S. PATENT DOCUMENTS
4,422,723 A 12/1983 Williams, Jr. et al.
6,791,741 B2 * 9/2004 Hishioka ............... 359/291

2003/0184887 A1 10/2003 Greywall et al.

OTHER PUBLICATIONS

P. Grosso et al.,"The membrane mirror as an adaptive optical element", Journal of the Optical Society of America, vol. 67, No. 3, Mar. 1977.
Bifano T.G. et al., "High-Speed Wavefront Control Using MEMS Micromirrors", Proceedings of SPIE, 5895:1-9 (2005), XP-002427939.
Takami H., "Membrane Deformable Mirror for Subaru Adapative Optics", Proceedings of SPIE, 2201:762-767 (1994), XP-002427940.

* cited by examiner

*Primary Examiner*—Euncha P Cherry
(74) *Attorney, Agent, or Firm*—Scully, Scott, Murphy & Presser, P.C.

(57) ABSTRACT

A deformable mirror includes a deformable section in which, a reflecting surface is formed, a fixing section which fixes an outer periphery of the deformable section, a GND electrode which is formed on the deformable section, a drive electrode which is provided facing the GND electrode, and a driving-signal source which deforms the deformable section by an electric voltage applied between the GND electrode and the drive electrode. The deformable mirror is sealed such that a pressure inside to be lower than an atmospheric pressure, and is provided with a capacitance detecting circuit which detects a change in response characteristics of the deformable section associated with a pressure change of a sealed-inside.

8 Claims, 30 Drawing Sheets

FIG.26A
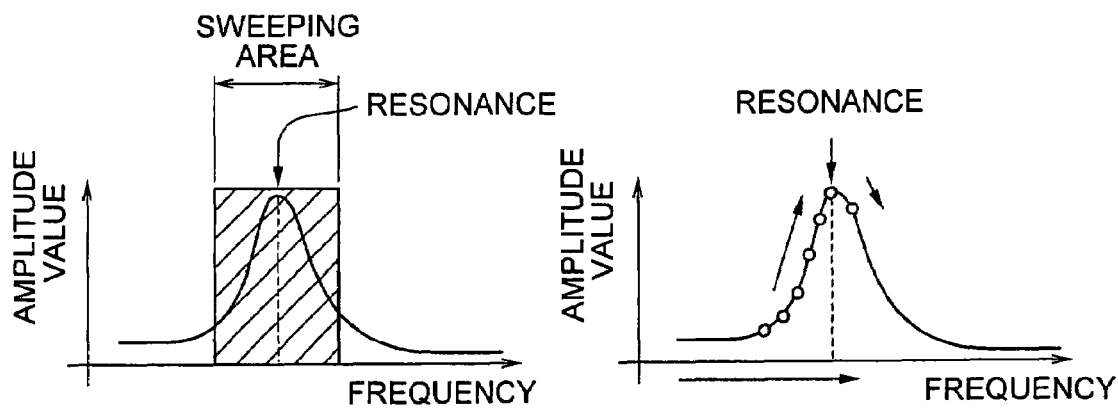
FIG.26B
FIG.26C
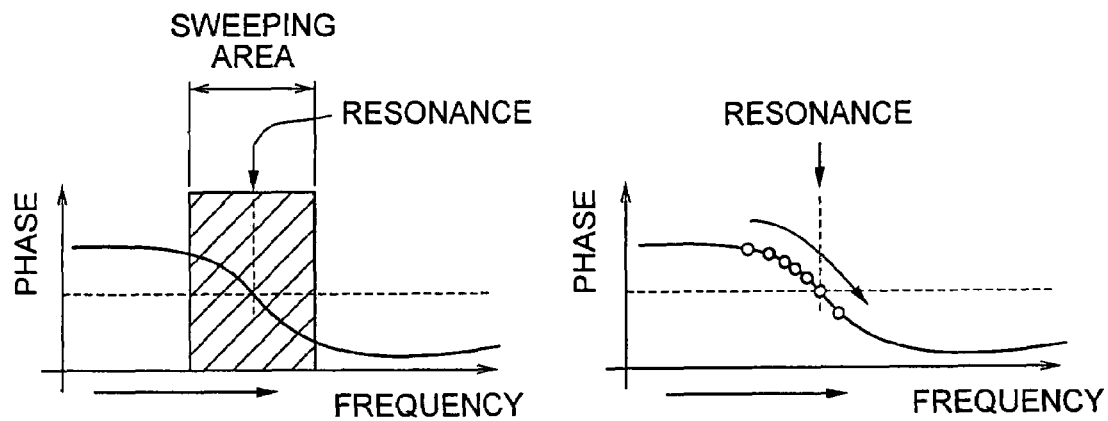
FIG.26D

DEFORMABLE MIRROR

CROSS-REFERENCE TO RELATED APPLICATION

The present application is based upon and claims the benefit of priority from the prior Japanese Patent Application No. 2006-038818 filed on Feb. 16, 2006; the entire content of which are incorporated herein by reference.

BACKGROUND OF THE INVENTION

1. Field of the Invention

The present invention relates to a deformable mirror which is capable of deforming continuously a shape of a reflecting surface, and particularly to a small-size deformable mirror which is manufactured by applying a semiconductor-manufacturing technology.

2. Description of the Related Art

A structure in which a deformable mirror is used by sealing inside thereof upon reducing pressure (upon depressurizing) has hitherto been proposed (for example, refer to "The membrane mirror as an adaptive optical element", Journal of the Optical Society of America, Volume 67, No. 3, March 1977). FIG. 23A shows a perspective view of a conventional deformable mirror 10, and FIG. 23B shows a cross-sectional view of the conventional deformable mirror 10. Moreover, FIG. 24 shows another cross-sectional view of the deformable mirror 10.

As shown in FIG. 24, in the deformable mirror 10, a ground (GND) is formed on a membrane (thin film) 11 on which the reflecting surface is formed. A plurality of drive electrodes 13 is formed at intervals at positions facing the GND. Moreover, a voltage is applied between the drive electrodes 13 and the GND. Accordingly, the membrane 11, in other words the reflecting surface, is deformed by an electrostatic force which is generated.

Moreover, a glass lid 12 for sealing upon vacuumizing is provided facing a surface on which the reflecting surface is formed. An electroconductive thin film 14 is formed on a surface of the glass lid 12 facing the reflecting surface. A voltage is also applied to the electroconductive thin film 14. Accordingly, the reflecting surface can be deformed to a concavo-convex by combining the electrostatic force in which the drive electrode 13 is used. Accordingly, it is possible to change a direction of reflection of a beam L.

In a case of an electrostatic drive in which the electrostatic force is used, a gap between the GND and the drive electrode 13 is narrow. Therefore, at the time of driving the membrane 11, air in the gap becomes a damper (air damping). As a result of this, response characteristics of the membrane 11 are affected adversely. Therefore, in the deformable mirror 10, the pressure is reduced to approximately 2.0 Torr, and an effect of the air damping is suppressed.

However, when the deformable mirror is used in a vacuum environment, a pressure in the sealed-inside changes in course of time due to a problem in sealing technology. With the change in the pressure, the response characteristics of the deformable mirror are changed. Consequently, a problem that a desired response cannot be achieved arises.

SUMMARY OF THE INVENTION

The present invention is made in view of the abovementioned circumstances, and an object of the present invention is to provide a deformable mirror which is capable of achieving a desired response in a vacuum environment.

To solve the abovementioned issues, and to achieve the object, according to the present invention, it is possible to provide a deformable mirror which includes a deformable section on which, a reflecting surface is formed, a fixing section which fixes an outer periphery of the deformable section, a first electrode which is formed on the deformable section, a second electrode which is provided facing the first electrode, and a driving-signal source which deforms the deformable section by a voltage applied between the first electrode and the second electrode. The deferrable mirror is sealed such that a pressure inside is let to be lower than an atmospheric pressure, and further includes a monitoring section which detects a change in response characteristics of the deformable section, associated with a pressure change of a sealed-inside.

Moreover, according to a preferable aspect of the present invention, it is desirable that the monitoring section includes a vibration detector which detects a vibration waveform of the deformable section which vibrates, and at least a part of which is provided on the deformable section, and a change in an amplitude of deformation of the deformable section is detected by the vibration detector, and the response characteristics of the deformable section are monitored based on a relationship between a pressure and the amplitude of deformation.

Furthermore, according to another preferable aspect of the present invention, it is desirable that the monitoring section includes a Q-value detector which detects a Q-value when the deformable section undergoes resonant vibration, and the response characteristics of the deformable section are monitored based on a relationship between the pressure and the Q value.

According to still another preferable aspect of the present invention, it is desirable that the monitoring section includes a phase-difference detecting circuit which detects a phase difference between the vibration waveform of the deformable section obtained by the vibration detector, and a driving signal which is output from the driving-signal source, and the response characteristics of the deformable section are monitored based on a relationship between the pressure and the phase difference.

Moreover, according to still another preferable aspect of the present invention, it is desirable that the monitoring section includes a resonance-frequency detector which detects a resonance frequency when the deformable section undergoes resonant vibration, and the response characteristics of the deformable section are monitored based on a relationship between the pressure and the resonance frequency.

Furthermore, according to still another preferable aspect of the present invention, it is desirable that the vibration detector is a capacitance detector which detects a capacitance between the first electrode and the second electrode.

According to still another preferable aspect of the present invention, it is desirable that the vibration detector includes a third electrode which is provided facing the first electrode, and the vibration detector is a capacitance detector which detects the capacitance between the first electrode and the third electrode.

According another aspect of the present invention, it is possible to provide a deformable mirror which includes a deformable section on which a reflecting surface is formed, a fixing section which fixes an outer periphery of the deformable section, a first electrode which is formed on the deformable section, a second electrode which is provided facing the first electrode, and driving-signal source which deforms the deformable section by a voltage applied between the first electrode and the second electrode. The deformable mirror is sealed such that a pressure in the sealed-inside is let to be lower than an atmospheric pressure, and further includes a pressure sensor which detects a pressure of a sealed-inside.

BRIEF DESCRIPTION OF THE DRAWINGS

FIG. 26A to FIG. 26D are diagrams which describe a concept of detection of a resonance-frequency detecting circuit;

DETAILED DESCRIPTION OF THE INVENTION

Embodiments of a deformable mirror according to the present invention will be described below in detail with reference to the accompanying diagrams. However, the present invention is not restricted to these embodiments.

First Embodiment

Figure 1:
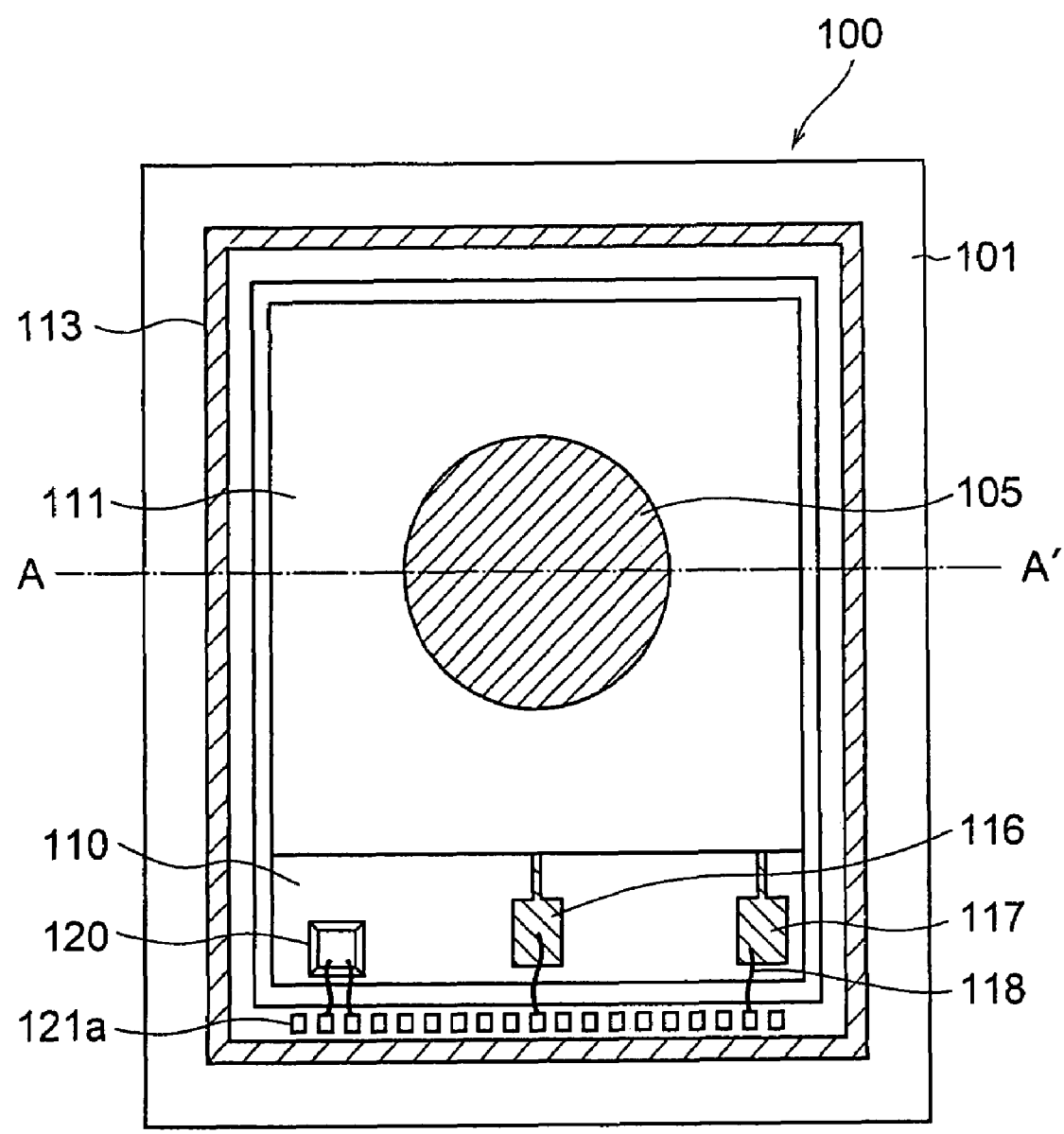
FIG. 1 is a top view of a basic structure of a deformable mirror according to a first embodiment.
Figure 2:
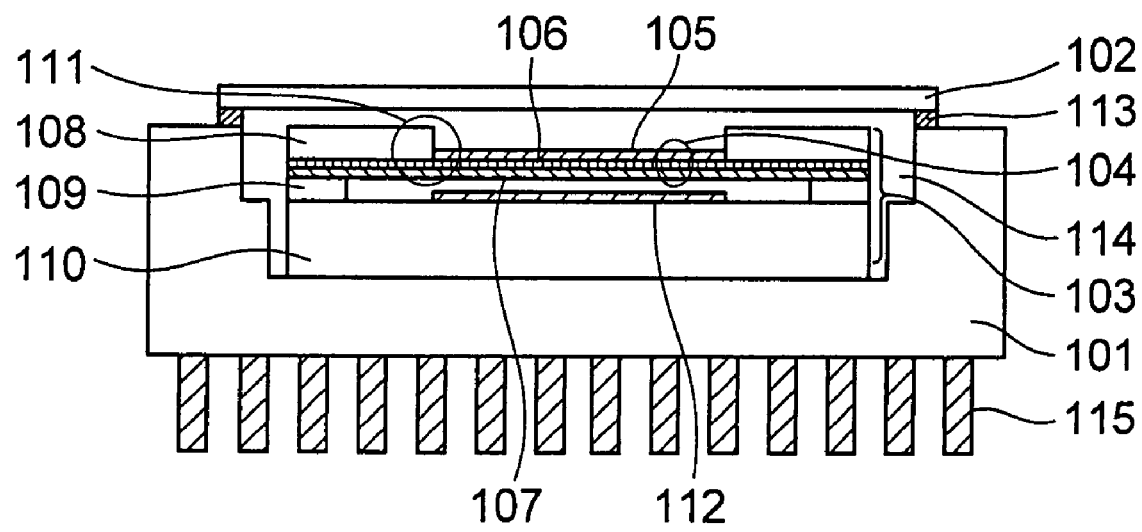
FIG. 2 is a cross-sectional view of the basic structure of the deformable mirror according to the first embodiment.

A deformable mirror according to a first embodiment of the present invention will be described below. FIG. 1 shows a top view of a basic structure of a deformable mirror 100. FIG. 2 shows a cross-sectional (side) view taken along a cross section A-A' shown in FIG. 1.

A sealed-inside 114 which can be sealed to be airtight by a ceramic package 101 and a glass lid 102 is formed in the deformable mirror 100 as shown in the cross-sectional view in FIG. 2. A deformable mirror unit 103 is formed in the sealed-inside 114. The sealed-inside 114 is depressurized.

The deformable mirror unit 103 includes a mirror substrate 111, a spacer 109, and an electrode substrate 110. The mirror substrate 111 includes a deformable section 104, and a fixing section 108 which fixes the deformable section 104. Furthermore, the deformable section 104 includes a reflecting surface 105, an elastic film 106, and a GND electrode 107.

Moreover, the fixing section 108 is thicker than the deformable section 104, and has a stiffness more than a stiffness of the deformable section 104. Therefore, the fixing section 108 is not deformed by a force which deforms the deformable section 104. The elastic film 106 in the deformable section 104 is extended up to the fixing section 108, and is formed over an entire surface of the mirror substrate 111.

The electrode substrate 110 includes a drive electrode 112 at a position facing the deformable section 104. The mirror substrate 111 and the electrode substrate 110 are assembled to maintain a gap via the spacer 109. Further, the deformable mirror unit 103 is fixed to the ceramic package 101.

As an adhesive or a joining method to be used for fixing each of the mirror substrate 111, the electrode substrate 110, the spacer 109, and the ceramic package 101, it is desirable to use a method of sealing upon depressurizing such that no gas is leaked in depressurized state. The sealing is performed by joining (metal joining: using solder or gold) the glass lid 102 and the ceramic package 101 by using a metallic layer 113 for joining in a depressurized environment. The sealing may also be performed by adhesion, and not only joining.

As shown in FIG. 1, the mirror substrate 111 has at least one side shorter than a side of the electrode substrate 110. An extraction electrode for driving 116 and an extraction electrode for GND 117 are formed on the electrode surface 110 not facing the mirror substrate 111.

Metal wire 118 is connected to each of the extraction electrode for driving 116 and the extraction electrode for GND 117 by using a method such as a wire bonding. The extraction electrode for driving 116 and the extraction electrode for GND 117 are connected to electrodes 121a of the ceramic package 101 via metal wires. Moreover, pins of the ceramic package 101 are connected to an external power supply etc. which will be described later.

The electrodes 121a of the ceramic package 101 also are formed in the sealed inside, and are sealed including the metal wires 118. A pressure sensor 120 is installed on the electrode substrate 110. The pressure sensor 120 is also electrically connected to the electrodes 121a of the ceramic package 101 by the metal wires 118 by the wire bonding.

For the pressure sensor 120, types such as a diaphragm-type sensor, a Pirani gage and so on may be taken into consideration. Moreover, in recent years, with the advancement in reduction of size, pressure sensor 120 having a practically used size which can be accommodated in the ceramic package 101, is available. A pressure inside the sealed-inside 114 is measured by the pressure sensor 120.

Figure 3:
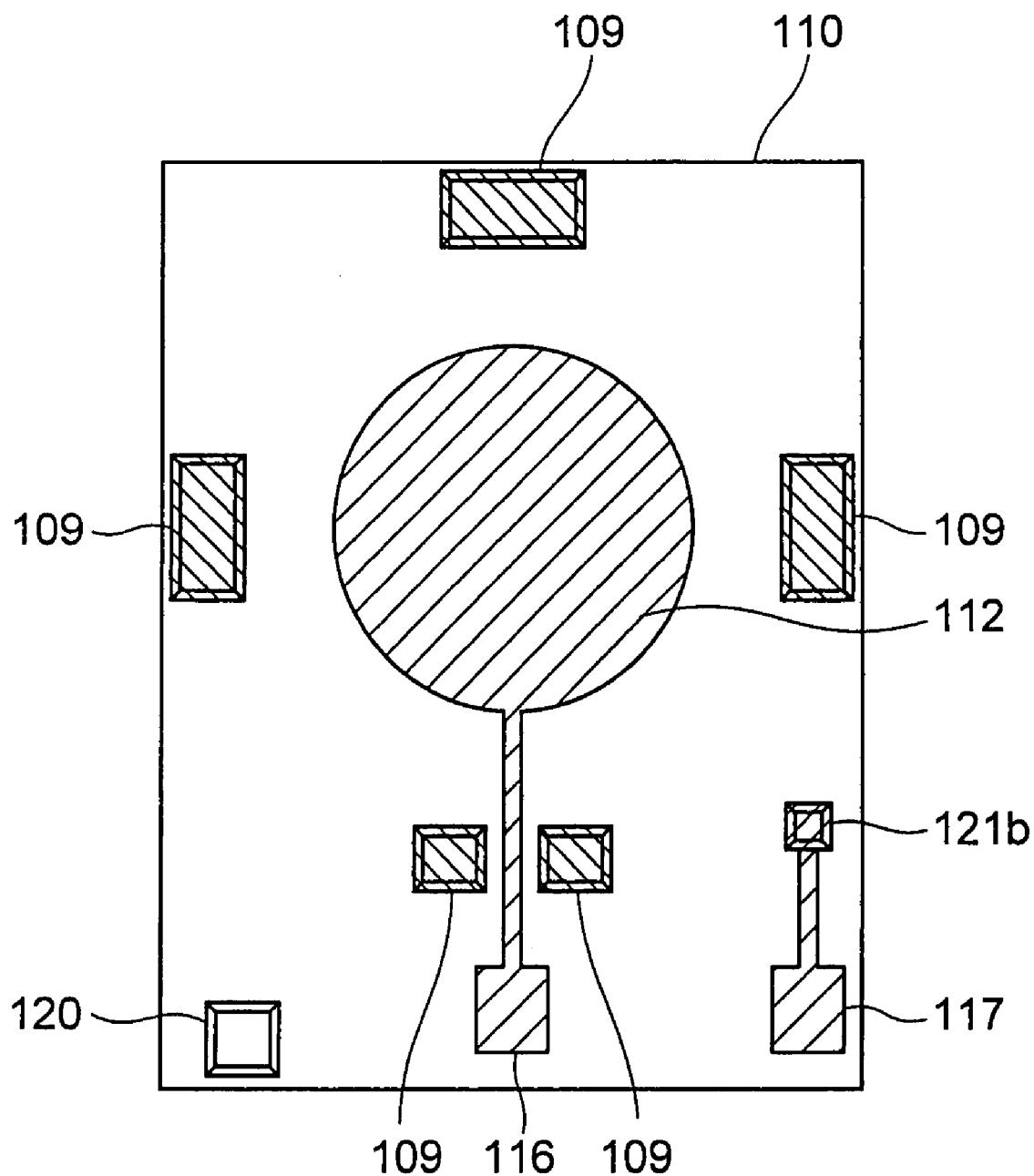
FIG. 3 is a diagram showing an electrode substrate of the first embodiment.
Figure 4:
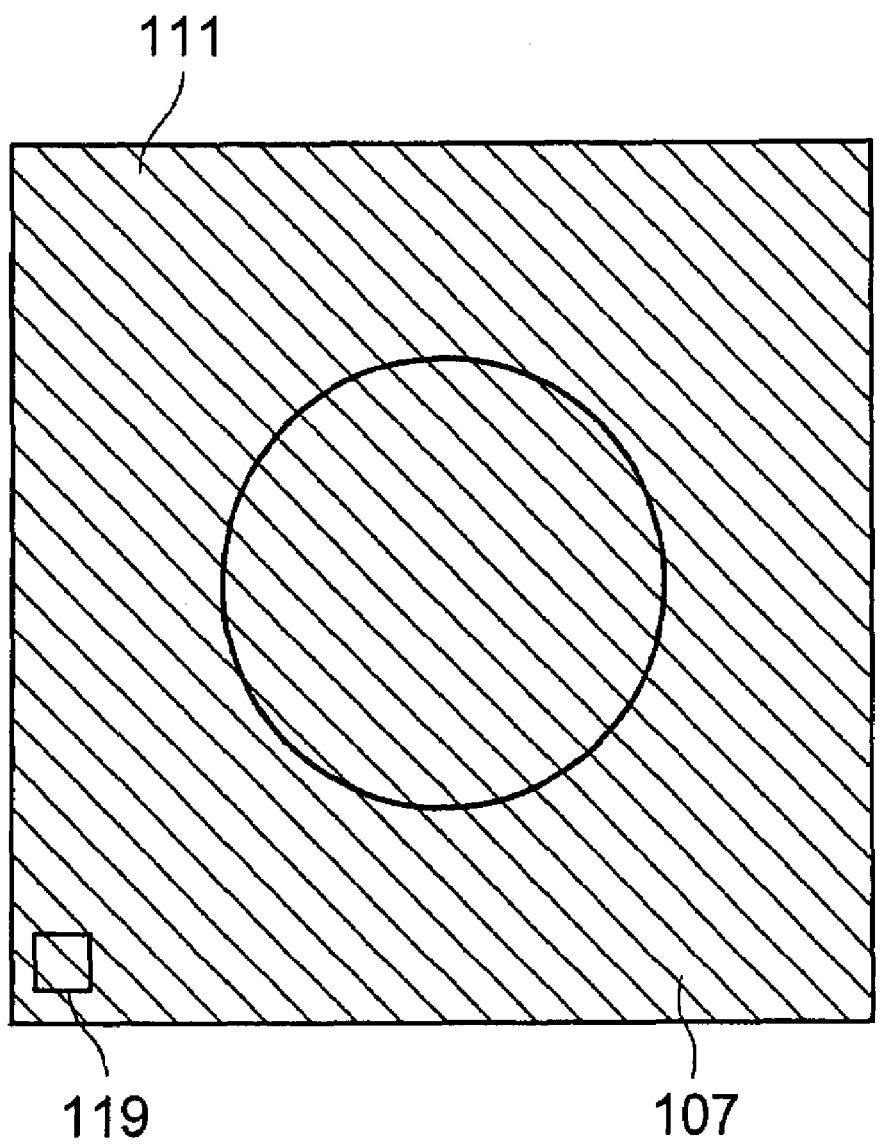
FIG. 4 is a diagram showing a mirror substrate of the first embodiment.

Each of FIG. 3 and FIG. 4 shows a disassembled structure of the deformable mirror 100. FIG. 3 shows the electrode substrate 110. FIG. 4 shows the mirror substrate 111. The drive electrode 112 on the electrode substrate 110 is electrically connected to the extraction electrode for driving 116, by a wire. The drive electrode 112 corresponds to a second electrode.

The extraction electrode for GND 117 is connected to an electroconductive material for electric connection 121b by a wire. The electroconductive material for electric connection 121b has a same height as the spacer 109 formed on the electrode substrate 110. Accordingly, when the mirror substrate 111 and the electrode substrate 110 are assembled, it is possible to connect electrically the GND electrode 107 on the mirror substrate 111, and the extraction electrode for GND 117 on the electrode substrate 110.

The spacer 109 is disposed upon dividing, on the electrode substrate 110 to relieve air between the electrode substrate 110 and the mirror substrate 111, at the time of depressurizing. However, the spacer 109 is not necessarily required to be divided. When the spacer 109 is not split (divided), it is desirable to provide an opening in a part of the spacer 109, and make a structure to relieve air.

FIG. 4 shows a structure of a rear surface of a surface which forms the reflecting surface 105. A metal film which becomes the GND electrode 107 is formed uniformly on an entire surface of the fixing section 108 and the deformable section 104. The GND electrode 107 corresponds to a first electrode. A position facing the electroconductive material for electric connection 121b at the time of assembling is shown formally in the diagram as a connecting section for electroconductive material 119.

A non-conductive material such as glass is used as a substrate material for the electrode substrate 110. Moreover, it is also possible to use a conductor or a semiconductor as the substrate material. In such case, an insulating thin film is formed between the drive electrode 112 and the substrate material.

The drive electrode 112 and the wire, the extraction electrode for driving 116, and the extraction electrode for GND 117 are formed to be integrated from the same film, and can be prepared as a single layer. A material such as aluminum or copper is used. Although is not shown in the diagram, an insulating film may further be formed on the wires other than the extraction electrodes, and the drive electrodes 112. Accordingly, it is possible to prevent a short circuit when the deformable section 104 makes a contact with the drive electrode 112, for example.

In the mirror substrate 111, silicon is used for the fixing section 108. As a material forming the deformable section 104, an organic film such as polyimide or an inorganic film such as silicon is used. Silicon film is advantageous when a morphological stability is considered to be significant. However, in a case of silicon film, a substantial force is necessary for deformation.

Silicon which forms the fixing section 108 is removed from a portion corresponding to the deformable section. Moreover, the reflecting surface 105 is formed on the deformable section 104. A material of the reflecting surface 105 varies according to a wavelength of light irradiated on the reflecting surface 105. A material such as aluminum, gold, and a dielectric multi-layered film for example, is used. When aluminum is used, a film of a silicon oxide is formed on aluminum for preventing oxidation.

Figure 5:
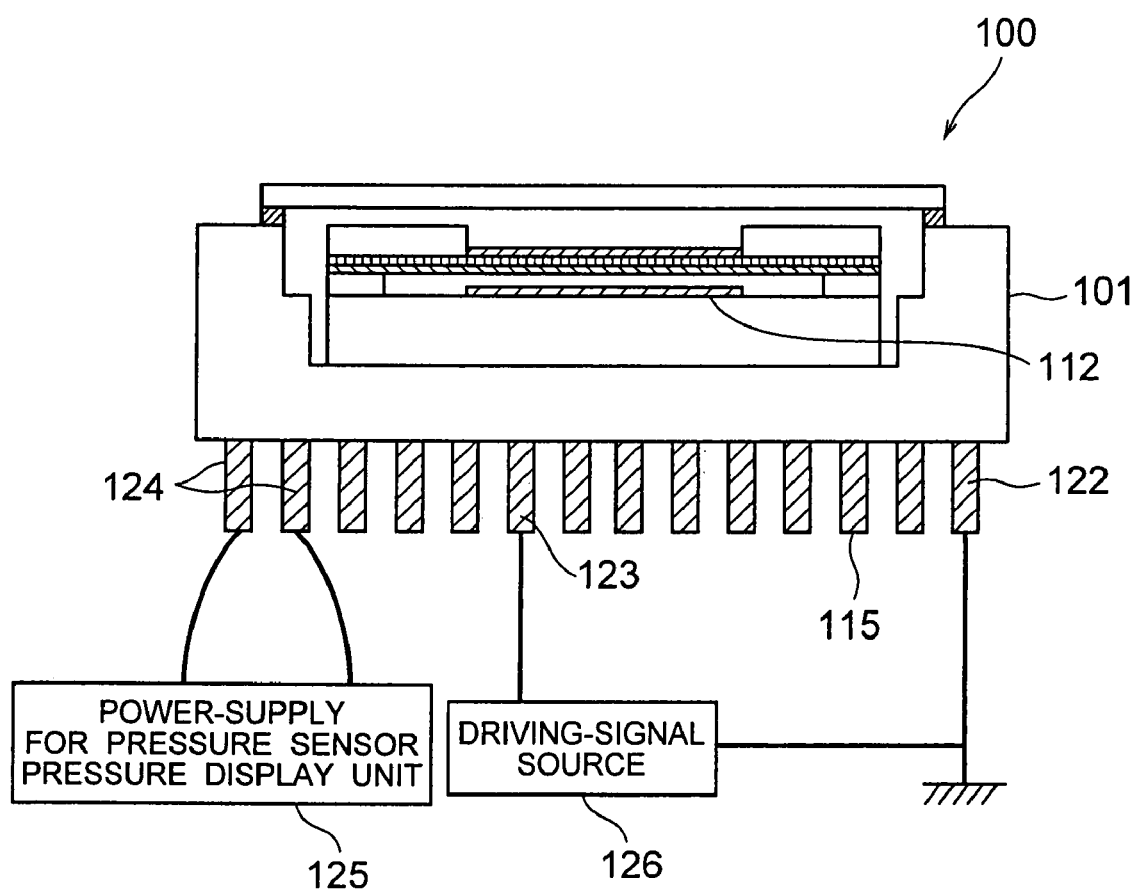
FIG. 5 is a diagram of a basic circuit structure of the deformable mirror according to the first embodiment.

Next, a driving method of the deformable mirror 100 will be described below while referring to FIG. 5, FIG. 6A, FIG. 6B, FIG. 7A, and FIG. 7B. In FIG. 5, from among pins 115 of the ceramic package 101, a pin which is electrically connected to the extraction electrode for driving 116 is let to be a drive electrode pin 123. Similarly, a pin 115 which is electrically connected to the extraction electrode for GND 117 is let to be a GND electrode pin 122.

A driving-signal source 126 is connected to the drive electrode pin 123. Moreover, the GND electrode pin 122 is connected to the GND. When a voltage is applied to the driving-signal source 126, a voltage is applied to the drive electrode 112. An electrostatic force is generated due to an electric potential difference with the GND electrode 107 formed on the deformable section 104. This electrostatic force being an electrostatic force, the deformable section 104 is deformed in a direction of the drive electrode 112. Moreover, a gap which is determined by the height of the spacer 109 is called as an electrostatic gap. A size of the electrostatic gap has an effect on a driving force as well as on an amount of deformation of the deformable section 104. A minimum value of the size of the electrostatic gap can be estimated approximately from the maximum amount of deformation of the reflecting mirror 105. Generally, the size of the electrostatic gap approximately three times or more of the maximum amount of deformation of the reflecting mirror 105 is necessary.

Furthermore, a power-supply pressure display unit for pressure sensor 125 is connected to a pressure-sensor electrode pin 124 which is electrically connected to the pressure sensor 120 shown in FIG. 1. Accordingly, it is possible to transmit an electric signal to the pressure sensor 120, as well as to display a sensing result.

Figure 6A:
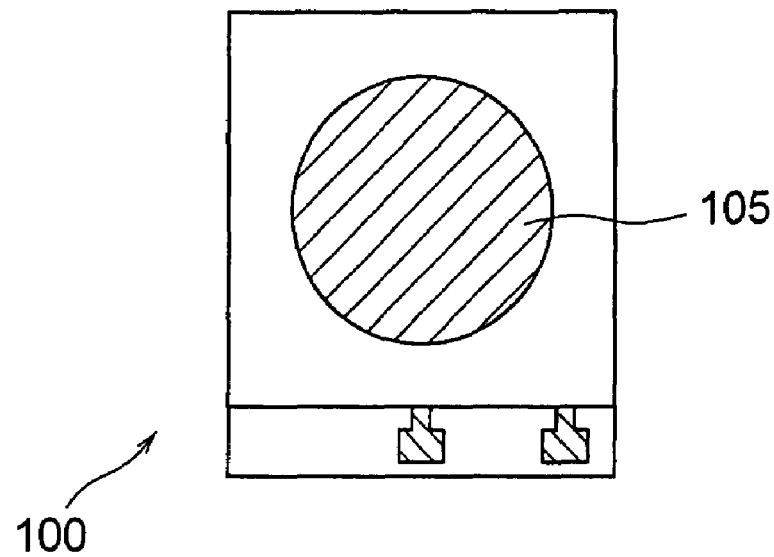
FIG. 6A and FIG. 6B are diagrams showing a change in a reflecting surface on a deformable section when a voltage is not applied.
Figure 6B:
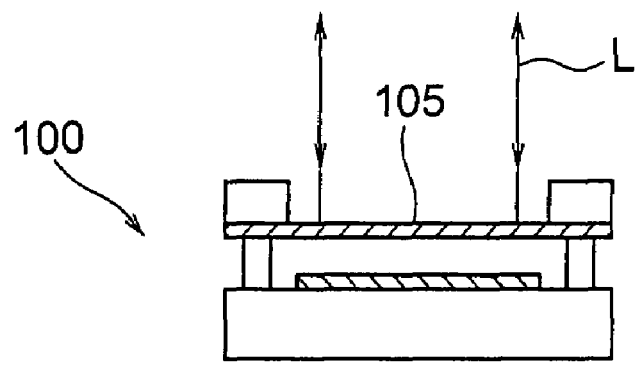
Figure 7A:
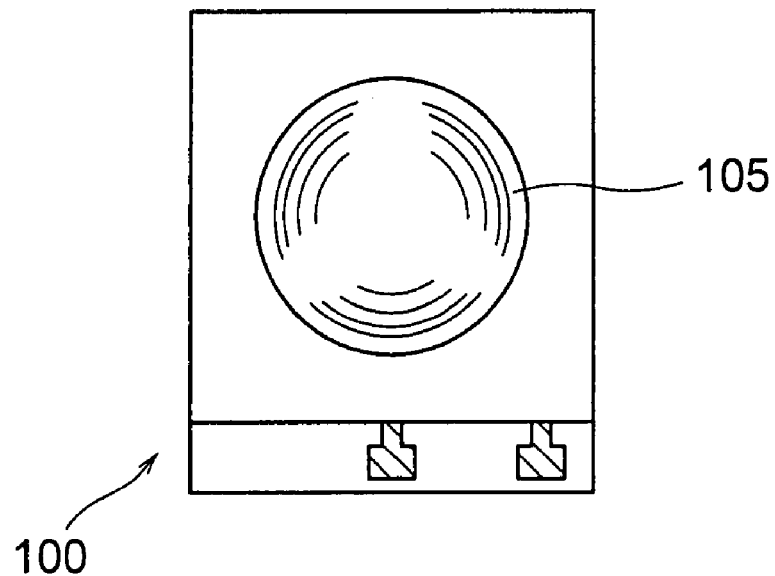
FIG. 7A and FIG. 7B are diagrams showing a change in the reflecting surface on the deformable section when the voltage is applied.
Figure 7B:
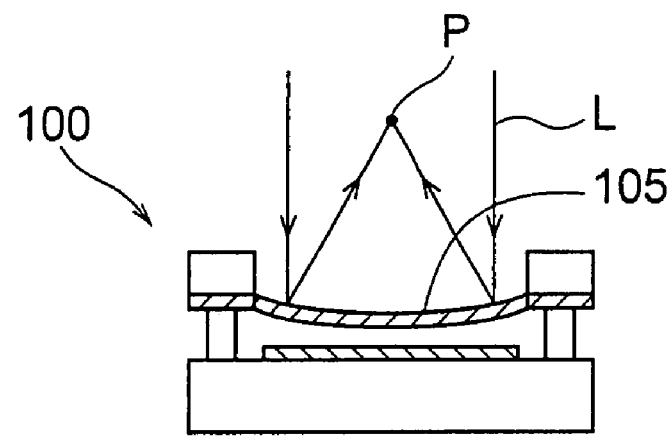

FIG. 6A, FIG. 6B, FIG. 7A, and FIG. 7B show deformation of the reflecting surface 105 on the deformable section 104 of the mirror substrate 111. Each of FIG. 6A and FIG. 6B shows a case when the voltage is not applied. Moreover, each of FIG. 7A and FIG. 7B shows a case when the voltage is applied.

When the voltage is not applied to the drive electrode 112, the reflecting surface 105 maintains a planar shape. Accordingly, when a parallel light beam L is incident, emerged light, in other words, reflected light is still parallel light as it has been.

When the voltage is applied to the drive electrode 112, the reflecting surface 105 is deformed and is changed to a curved surface shape. Due to this curved surface, when the parallel light beam L is incident, the emerged light, in other words, the reflected light is focused at a focal position P as shown in FIG. 7B. By changing the voltage, as a concave-surface shape or a radius of curvature of the reflecting surface 105 is changed, it is possible to change the focal position P.

Figure 8:
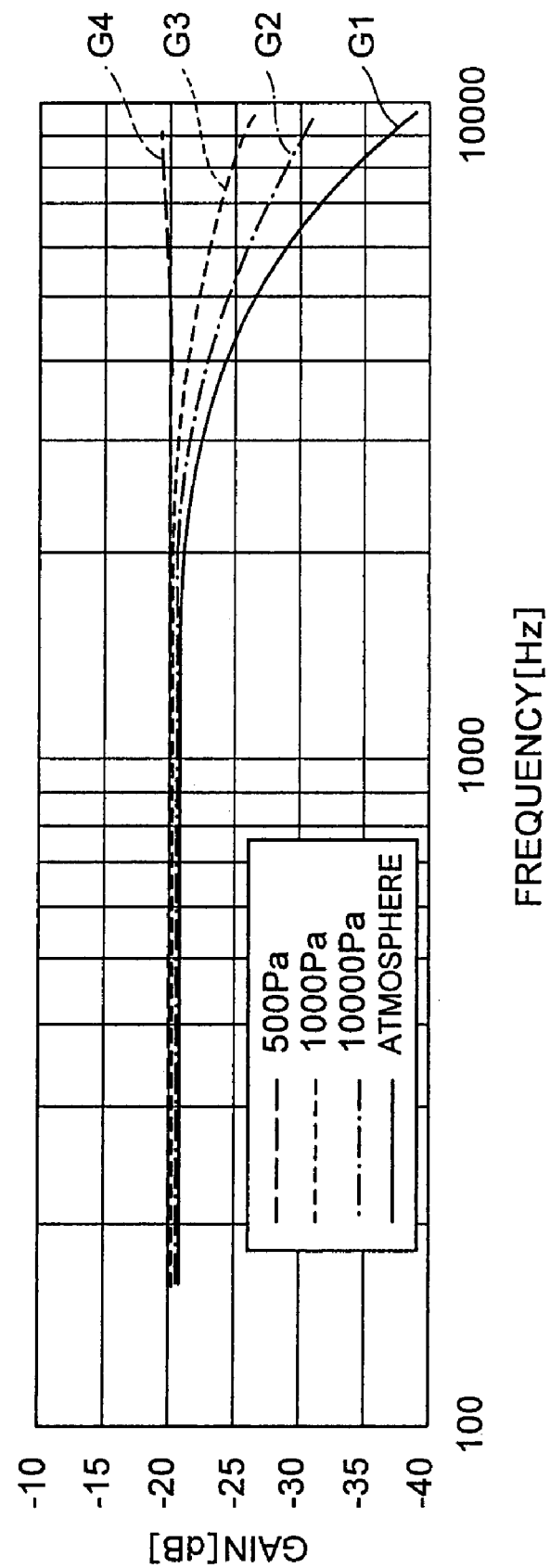
FIG. 8 is a diagram showing a pressure in a sealed-inside, and frequency characteristics of the deformable section.

Next, the pressure in the sealed-inside 114 and frequency response characteristics of the deformable section will be described by referring to FIG. 8. In FIG. 8, a horizontal axis is a drive frequency of the deformable section 104. Moreover, a vertical axis shows as decibel about a ratio of a driving signal applied to the drive electrode 112, and a vibration waveform of the deformable section 104, and shows a deformable gain of the deformable section 104.

In FIG. 8, cases in which the pressure in the sealed-inside 114 is as following are described.

(1) Curve G1: Atmospheric pressure
(2) Curve G2: 10000 Pa
(3) Curve G3: 1000 Pa
(4) Curve G4: 500 Pa When the pressure in the sealed-inside 114 is atmospheric pressure, in the characteristic curve G1, the drive gain is decreased in accordance with an increase in the drive frequency. In other words, response characteristics of the deformable section 104 are deteriorated in a high-frequency area. Moreover, as it is evident from FIG. 8, the curve G2, the curve G3, the curve G4, and response characteristics thereof are improved in accordance with the decrease in the pressure in the sealed-inside 114.

As shown in FIG. 2, in the deformable mirror 100, an interval between the GND electrode 107 formed on the deformable section 104, and the drive electrode 112 formed on the electrode substrate 110, in other words, the electrostatic gap is smaller as compared to an area of the deformable section 104. Therefore, air in the electrostatic gap becomes a damper. Therefore, it is possible to suppress a damping by depressurizing the air in the electrostatic gap. In a case of driving at a high speed with a structure of the deformable mirror 100 in which an electrostatic-drive type is used, it is desirable to seal the deformable mirror unit 103 with optimum depressurizing conditions.

Figure 9A:
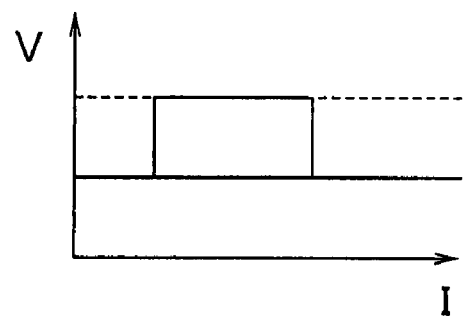
FIG. 9A to FIG. 9D are diagrams showing a signal applied to the drive electrode and an amount of deformation of the deformable section.
Figure 9B:
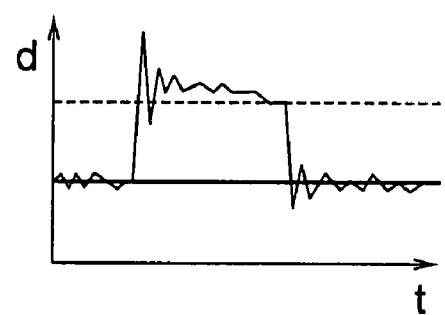

Furthermore, step response characteristics of the deformable section 104 will be taken into consideration. FIG. 9A to FIG. 9D show deformation of the deformable section 104 when a rectangular wave signal is applied to the drive electrode 112. A rectangular wave signal as shown in FIG. 9A is applied to the drive electrode 112. The deformation of the deformable section 104 with respect to the rectangular wave signal changes according to the pressure in the sealed-inside 114. FIG. 9B shows a result when the sealed-inside 114 is let to have a high vacuum. A horizontal axis indicates a time t and a vertical axis indicates an amount of the deformation of the deformable section 104. When the sealed-inside 114 is let to have high vacuum, it is in a state without a damper formed by the air in the electrostatic gap. Therefore, a resonance drive of the deformable section 104 is excited due to a high-frequency component. Accordingly, a ringing as shown in FIG. 9B occurs, and the deformation is not stabilized throughout, and keeps vibrating.

Figure 9C:
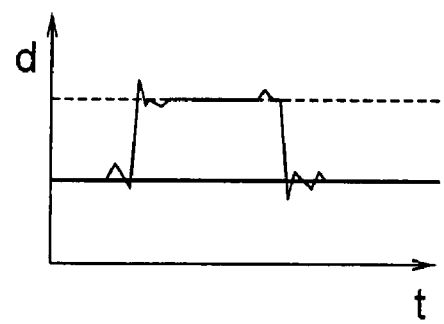
Figure 9D:
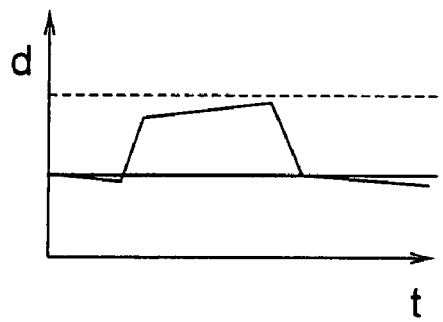

Whereas, when the sealed-inside 114 is at the atmospheric pressure as shown in FIG. 9D, due to the damping by the air in the electrostatic gap, the response of the deformable section 104 is deteriorated. The deformation is delayed also due to the rectangular wave of the driving signal, and an amount of deformation is reduced.

FIG. 9C is a result when the sealed-inside 114 is adjusted to the optimum pressure. By letting the pressure to be in a predetermined range, the deformable section 104 is deformed following the driving signal. Thus, from the result of the frequency response characteristics and the step response characteristics, it is revealed that the pressure in the sealed-inside 114 has an optimum area. It also depends on a size of the deformable section 104 and the size of the electrostatic gap, and it is revealed that the optimum range is from 1 Pa to 1000 Pa.

The pressure sensor 120 is used for monitoring that the pressure in the sealed-inside 114 is in the optimum range. Moreover, based on the pressure in the sealed-inside 114, it is possible to determine a change in the frequency response characteristics and the step response characteristics of the deformable section 104.

Second Embodiment

Figure 10:
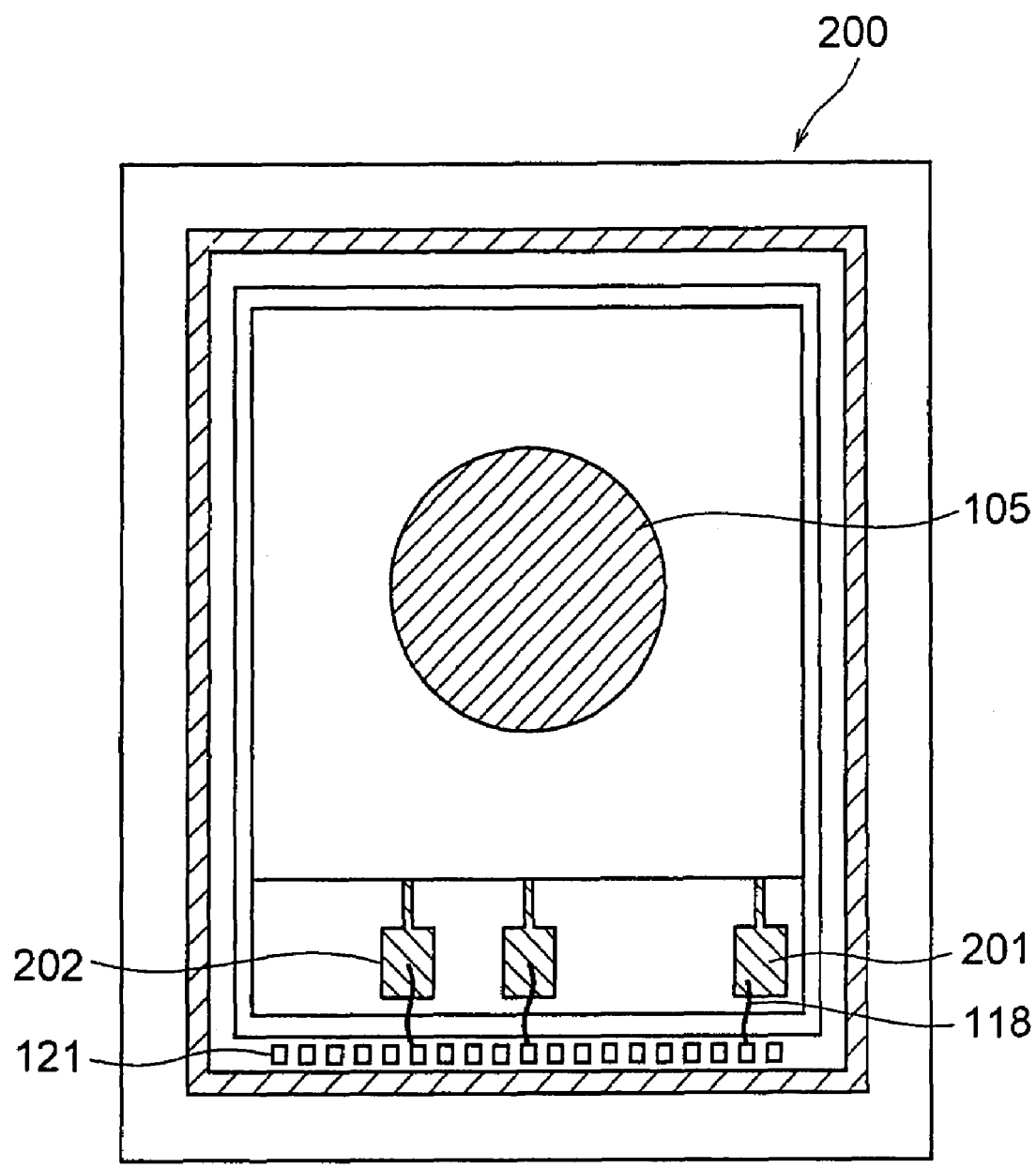
FIG. 10 is a top view of a basic structure of a deformable mirror according to a second embodiment.
Figure 11:
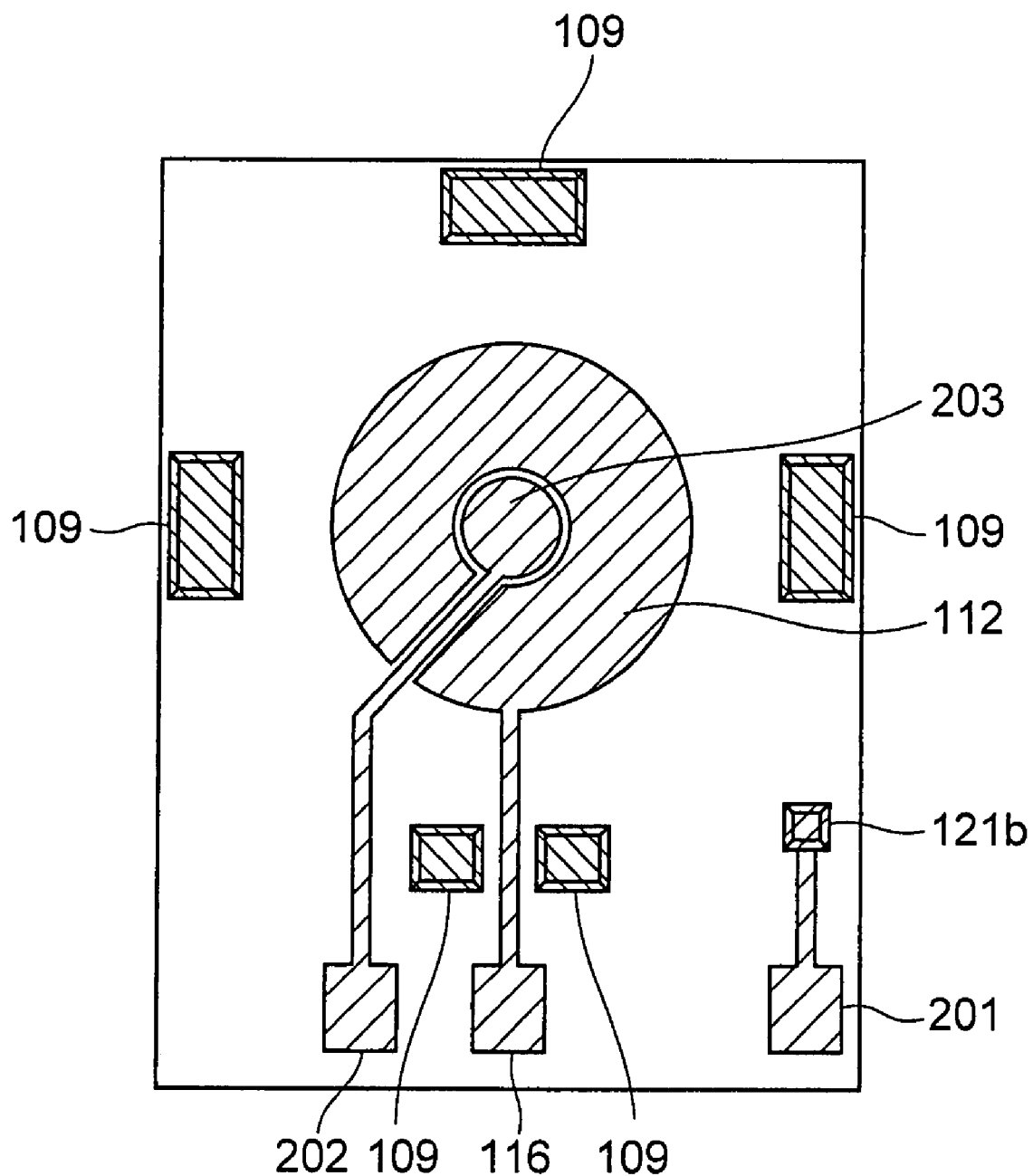
FIG. 11 is a diagram showing an electrode substrate of the second embodiment.
Figure 12:
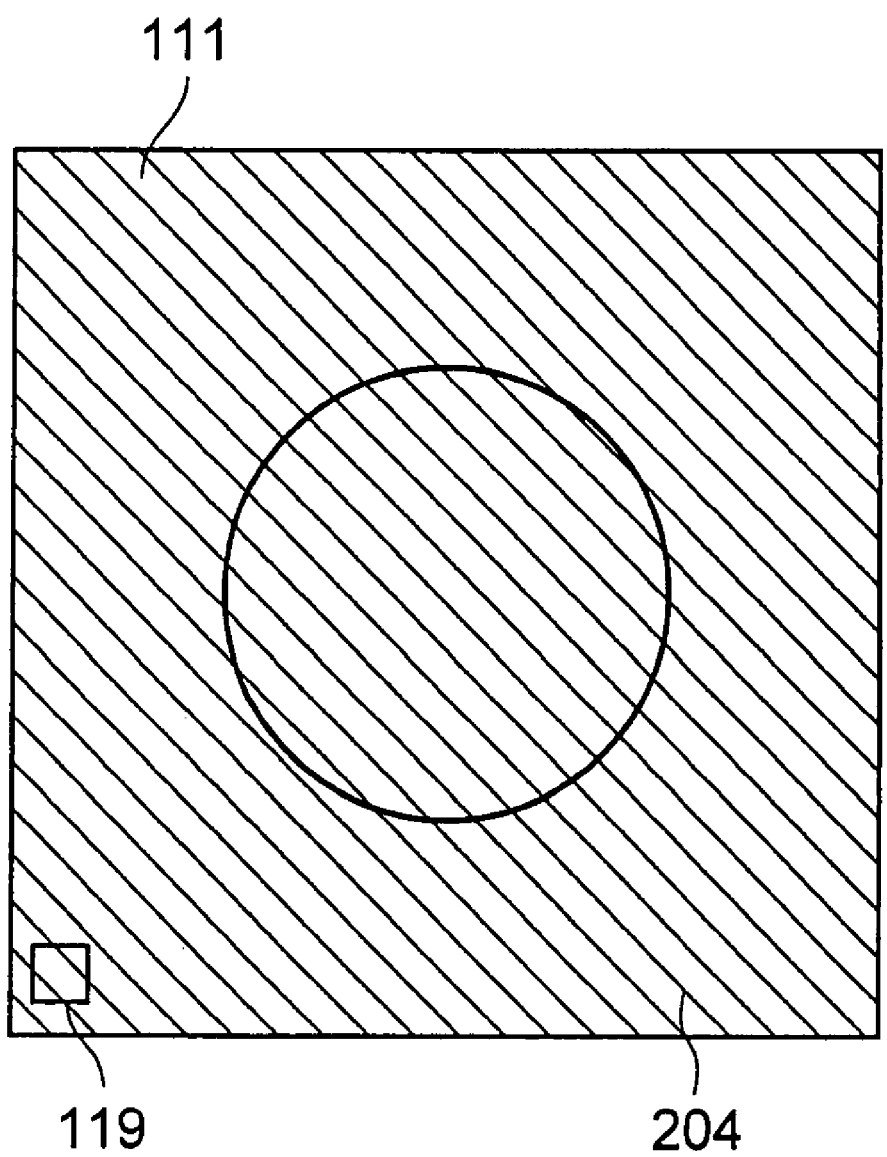
FIG. 12 is a diagram showing a mirror substrate of the second embodiment.

Next, a deformable mirror 200 according to a second embodiment of the present invention will be described below. Same reference numerals are used for components which are same as in the first embodiment, and the description to be repeated is omitted. FIG. 10 shows a top view of a basic structure of the deformable mirror 200. Moreover, FIG. 11 and FIG. 12 show a state in which the deformable mirror 200 is separated into the mirror substrate 111 and the electrode substrate 110.

The deformable mirror 200 uses a vibration detector instead of the pressure sensor 120 described in the first embodiment. The vibration detector detects a vibration wave of the deformable section 104. Accordingly, the arrangement is such that the response of the deformable section 104 is monitored.

The vibration detector measures an electrostatic capacitance between the deformable section 104 and the drive electrode 112. Accordingly, it is possible to detect the amount of deformation, an amount of amplitude, and further a vibration waveform of the deformable section 104. Moreover, it is possible to determine the response of the deformable section 104 from detection results.

The vibration detector includes a capacitive sensor electrode 203, a COM electrode 204, a reference-signal source 208, and a capacitance detecting circuit 209. As shown in FIG. 11, the capacitive sensor electrode 203 is formed near a center of the drive electrode 112, to be electrically independent from the drive electrode 112. The COM electrode 204 is formed facing the capacitive sensor electrode 203, and corresponds to the GND electrode 107 shown in the first embodiment.

Figure 13:
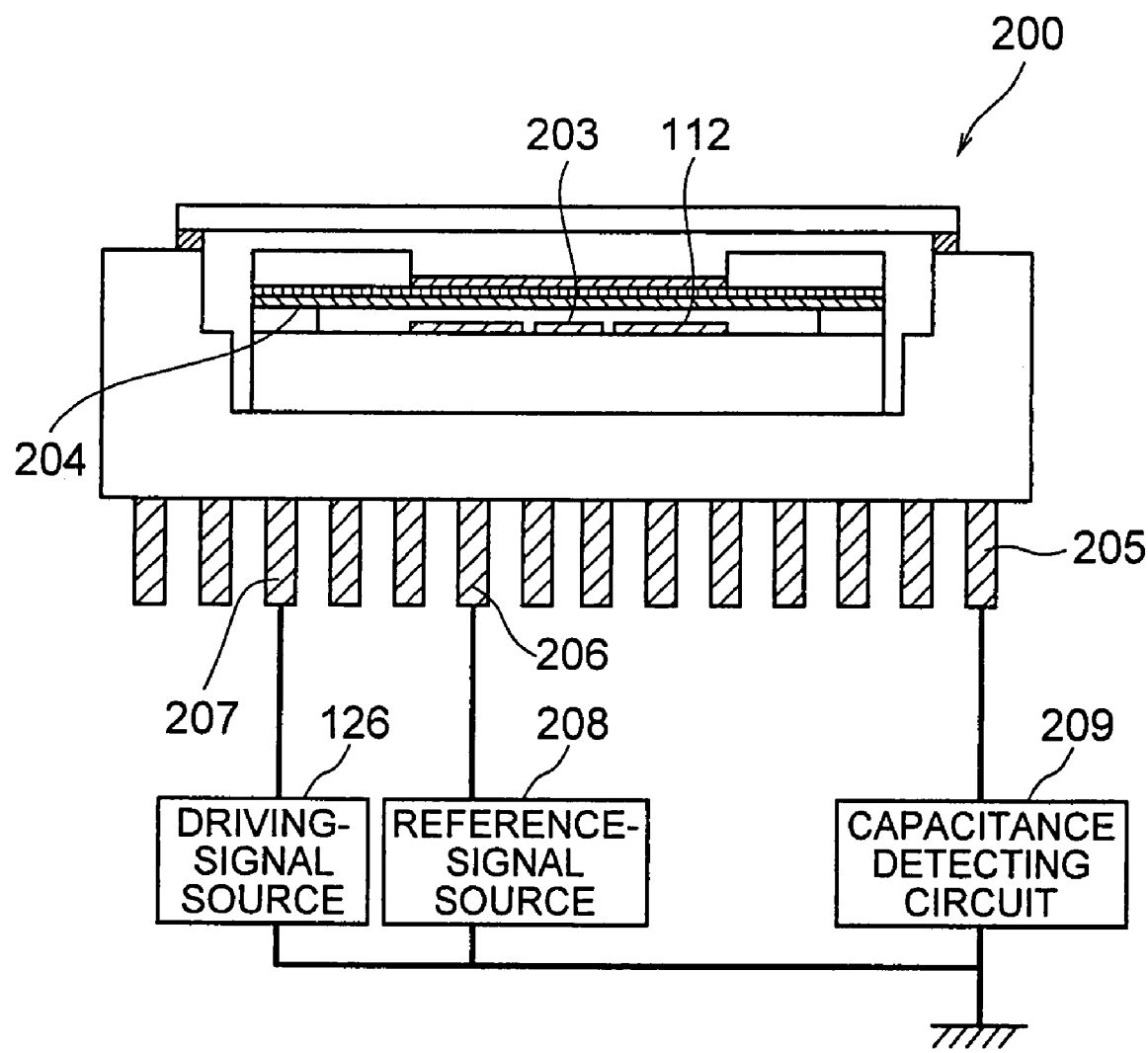
FIG. 13 is a diagram showing a basic circuit structure of the deformable mirror according to the second embodiment.

The reference-signal source 208, as shown in FIG. 13, is connected to a capacitive sensor electrode pin 206 of the ceramic package 101 which is electrically connected to the capacitive sensor electrode 203. Moreover, the capacitance detecting circuit 209 is connected to a COM electrode pin 205 which is electrically connected to the COM electrode 204 by a wire (wiring) Furthermore, a unit including the reference-signal source 208, the COM electrode 204, capacitive sensor electrode 203, and the capacitance detecting circuit 209 corresponds to a monitoring section.

In FIG. 13, although the reference-signal source 208, the driving-signal source 126, and the capacitance detecting circuit 209 have a GND in common, a separate GND may be provided to each thereof. Here, the COM electrode 204, similarly as the GND electrode 107 in the first embodiment, corresponds to the first electrode. Moreover, the capacitive sensor electrode 203 corresponds to a third electrode.

Figure 14:
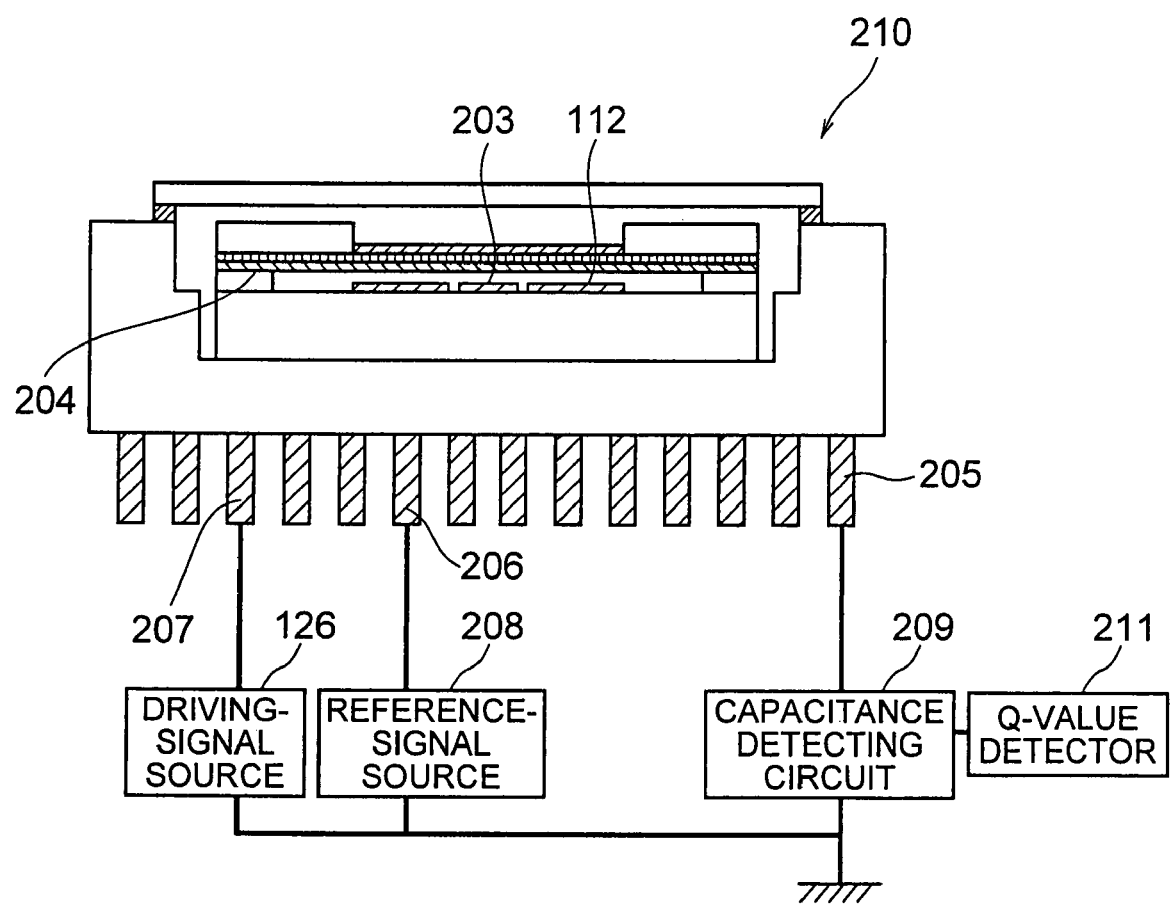
FIG. 14 is a diagram showing a basic circuit structure of a deformable mirror according to a modified embodiment of the second embodiment.

Furthermore, as shown in FIG. 14, a Q-value detector 211 may be provided in addition to the structure described above. The Q-value detector 211 is connected to the capacitance detecting circuit 209, and detects a Q-value when the deformable section 104 undergoes resonant vibration.

The Q-value is a value showing an amount of increase in the amplitude when the deformable section 104 is allowed to vibrate at the resonance frequency. In this case, a relationship between the Q-value when the deformable section 104 undergoes resonant vibration and the pressure is measured in advance before sealing, in an environment in which the pressure is changeable. Moreover, based on this relationship, the response characteristics of the deformable section 104 are determined. The Q-value at the time of resonance is low when the air dumping is substantial, and the Q-value increases in accordance with a decrease in the air dumping. Therefore, when the Q-value at the time of resonance is calculated, it is possible to monitor the change in the response characteristics of the deformable section 104. The Q-value will be described later in detail.

Next, an action of the vibration detector will be described while referring to FIG. 13 and FIG. 14 (deformable mirror 210). The reference-signal source 208 applies a sine-wave signal to the capacitive sensor electrode 203. A reference signal is changed based on a change in a capacitance between the COM electrode 204 and the capacitive sensor electrode 203, and becomes an output signal. The output signal reaches the capacitance detecting circuit 209 which is connected to the COM electrode pin 205 through the COM electrode 204. The capacitance detecting circuit 209 can detect the capacitance between the COM electrode 204 and the capacitive sensor electrode 203, based on the output signal.

The capacitive sensor electrode 203 is provided at the center for a reason that the amount of deformation of the deformable section 104 being the maximum near the center, the change in the capacitance is also the maximum, and as shown in the first embodiment, for a reason that it does not have a substantial effect on a deformed shape of the deformable section 104 even when compared to a case of the entire surface being the drive electrode 112.

A driving method is a method of applying the voltage to the drive electrode 112, similarly as in the first embodiment. Consequently, the deformable section 104 is deformed toward the drive electrode 112. A plane-parallel type condenser can be assumed between the COM electrode 204 and the capacitive sensor electrode 203. Due to the deformation of the deformable section 104, a gap between the COM electrode 204 and the capacitive sensor electrode 203 is changed. As a result of this, the output signal of the capacitance detecting circuit 209 shows the amount of deformation of the deformable section 104.

Figure 15:
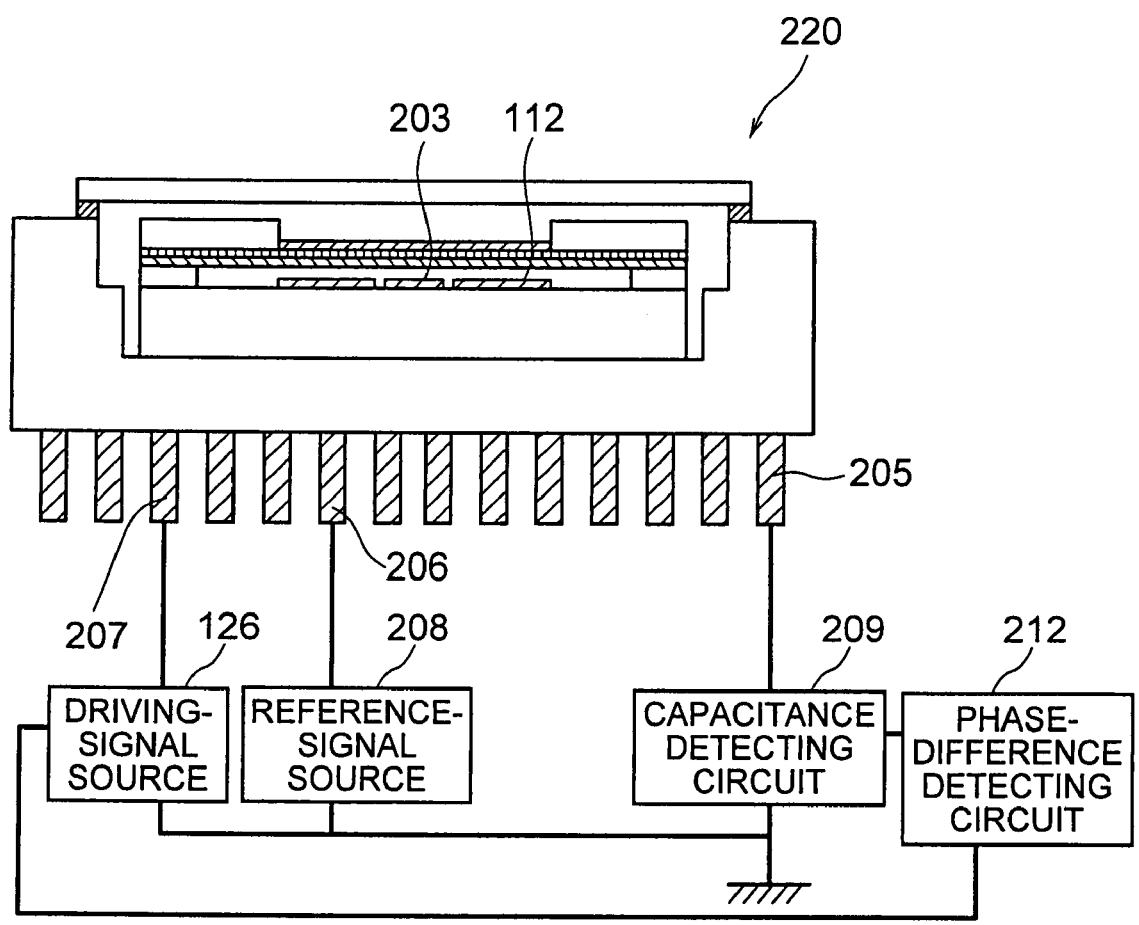
FIG. 15 is a basic circuit structure of a deformable mirror according to another modified embodiment of the second embodiment.

Furthermore, as shown in FIG. 15 (deformable mirror 220), an arrangement may be such that a drive waveform which is output from the driving-signal source 126, and a vibration waveform which is output from the capacitance detecting circuit 209 are input, and a phase-difference detecting circuit 212 which detects a phase difference between the drive waveform and the vibration waveform is provided. It is also possible to know the response characteristics from the phase difference.

Figure 16A:
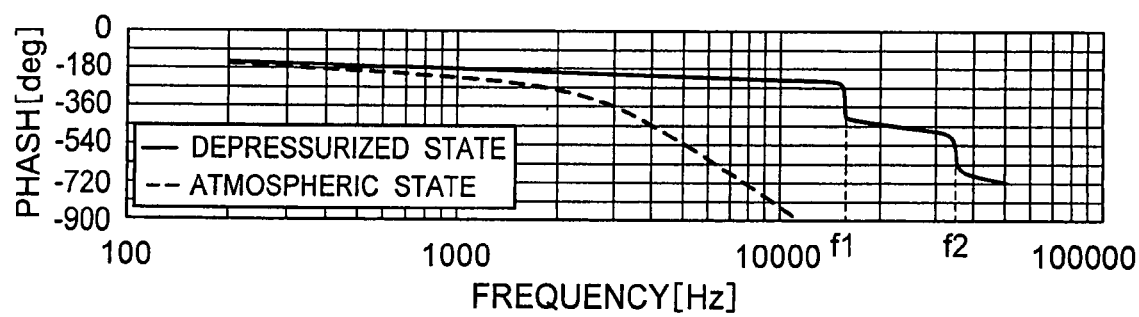
FIG. 16A and FIG. 16B are diagrams showing a phase of the deformable section, and frequency characteristics of a deformable gain.
Figure 16B:
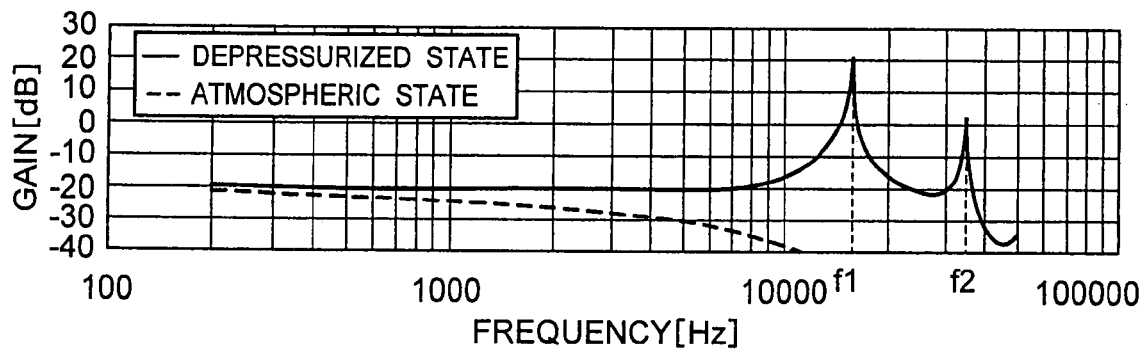

Next, a method for detecting the response characteristics of the deformable section 104 when the vibration detector is used, and when the phase-difference detecting circuit 212 is used, will be described. A result of detecting by the vibration detector, a change in the capacitance between the COM electrode 204 and the capacitive sensor electrode 203 while changing the frequency of the driving signal is shown in FIG. 16A and FIG. 16B. FIG. 16A and FIG. 16B show frequency response characteristics of the deformable section 104. A horizontal axis indicates the frequency. Moreover, a vertical axis in FIG. 16A indicates the phase difference of the drive waveform of the deformable section 104 with respect to the driving signal. A vertical axis in FIG. 16B shows in decibel a ratio of the vibration waveform of the deformable section 104 with respect to the driving signal (hereinafter, called appropriately as "gain").

In accordance with the increase in the frequency in an atmospheric environment, the phase as well as the gain goes on decreasing. Whereas, there is almost no change in the phase and the gain, till reaching a first resonance frequency f1 of the deformable section 104 in a depressurized environment. As the first resonance frequency f1 is exceeded, the gain starts to decrease. However, sometimes the gain is increased by a second resonance frequency f2 etc.

Regarding the phase difference, at the time of resonance, the phase is turned through 180 degrees, and after this also the phase is turned through 180 degrees by the second resonance frequency f2 etc. It is possible to detect the drive waveform of the deformable section 104 at this time by the capacitance detecting circuit 209. Moreover, when the driving signal coincides with the resonance frequency f1 and the resonance frequency f2, the amount of deformation of the deformable section 104 is increased. This amount of change is called as the Q-value as mentioned above. By detecting the Q-value by the Q-value detector 211, it is also possible to monitor the response of the deformable section 104.

Considering the Q-value detector 211 in a simple manner, a frequency of the amount of deformation when the amount of deformation at the time of resonance is decreased by 3 dB, is detected in both directions of an increase and a decrease in the frequency. Further, it is possible to show by expressing by a value obtained by dividing the resonance frequency by that difference. In other words, it can be expressed by the following expression.

$$Q=Fr/(Ff-Fb)$$

where,

Q denotes the Q value,

Fr denotes the resonance frequency of the deformable section 104,

Ff denotes a frequency at a point where the amount of deformation is decreased by 3 dB on a high-frequency side from the resonance frequency, and Fb denotes a frequency at a point where the amount of deformation is decreased by 3 dB on a low-frequency side from the resonance frequency.

Figure 17:
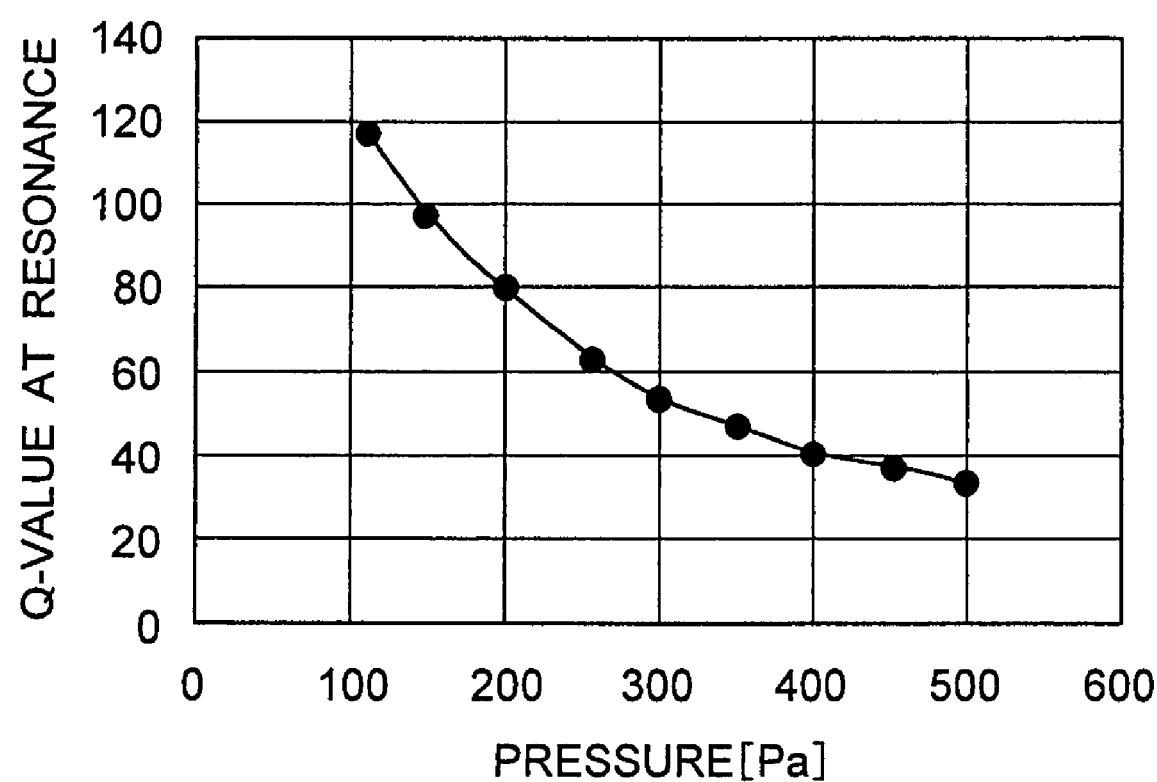
FIG. 17 is a diagram showing a relationship between the pressure in the sealed-inside, and a Q value.

The Q-value changes according to an amount of depressurization which seals the deformable mirror unit 103. When the pressure in the sealed-inside 114 becomes high (when the air dumping is increased) as shown in FIG. 17, the Q-value is decreased. By measuring the Q-value at the time of resonance, it is possible to monitor the change in the frequency characteristics of the deformable section 104.

Regarding the pressure in the sealed-inside 114, there is an optimum area for maintaining the frequency response characteristics and the step response characteristics of the deformable section 104 as described in the first embodiment. By monitoring that the pressure in the deformable section 104 is in this optimum area, it is possible to determine the frequency response characteristics and the step response characteristics of the deformable section 104.

The second embodiment is an example of detecting parameters which change in accordance with a change in the air damping, and determining the change in the response characteristics of the deformable section 104, since the change in the response characteristics of the deformable section 104 associated with the change in the pressure is an effect of air damping between the deformable section 104 and the drive electrode 112.

The response characteristics of the deformable section 104 are monitored by measuring the amplitude value of the deformable section 104 when the deformable section 104 is caused to vibrate with an arbitrary frequency, by the vibration detector which detects the vibration of the deformable section 104. The amplitude value of the deformable section 104 is a constant value till the sealed-inside 114 attains a certain pressure value, and decreases when this pressure value is exceeded. Consequently, by monitoring the amplitude value, it is possible to check whether or not the sealed-inside 114 is at a certain pressure value or less, as well as to know the pressure by detecting the amplitude value within a pressure range in which the amplitude value starts changing.

Before sealing, for the relationship between the amplitude value and the pressure of the deformable section 104, the measurement is performed in the environment in which the pressure is changeable, and based on this relationship, the response characteristics of the deformable section 104 are determined. As it has been mentioned above, in accordance with the increase in the pressure in the sealed-inside 114, the amplitude value of the deformable section 104 with respect to the same driving signal is decreased. When the drive frequency is the maximum frequency used in the deformable mirror 200, it is possible to know directly the response characteristics of the deformable section 104 by a judgment of whether or not a driving sensitivity of the deformable section 104 is changed. For the relationship between the Q value and the pressure when the deformable section 104 is undergoing resonant vibration, the measurement is performed before sealing, in the environment in which the pressure is changeable, and based on this relationship it is possible to determine the response characteristics of the deformable section 104.

Another monitoring function in which other vibration detector is used will be described below. In FIG. 16, in a depressurized state, the phase difference and the gain show almost a constant value in a frequency area having a frequency lower than the resonance frequency. Whereas, in the atmospheric state, both the values are decreased. Regarding the gain, as shown in FIG. 8, the decrease in the gain changes according to the pressure in the sealed-inside 114, and with the increase in the pressure, the gain goes on decreasing gradually.

The tendency same as for the gain can be mentioned for the phase difference which is detected by the phase-difference detecting circuit 212. The phase difference of the sealed-inside 114 is a constant value till a predetermined pressure value is attained, and when this pressure is exceeded, the phase-difference is increased. The phase difference changes according to the pressure, and there is a gradual increase in a phase delay according to the increase in the pressure.

Consequently, when the deformable section 104 is let to vibrate at an arbitrary frequency, by checking the gain by the vibration detector, or the phase difference by the phase-difference detecting circuit 212, it is possible to check whether or not the pressure in the sealed-inside 114 is a pressure range for which the gain and the phase difference are constant. At the same time, when the pressure in the sealed-inside 114 is lower than this pressure range, it is possible to measure the pressure from the gain and the phase difference.

In such case also, same as for the Q value, the relationship between the gain or the phase difference and the pressure of the deformable section 104 of the deformable mirror 200 is checked by the vibration detector, in a depressurizable chamber in which the pressure can be measured before sealing the deformable mirror 200, and a pressure table is prepared. Accordingly, the measurement of pressure in the sealed-inside 114 becomes possible. Furthermore, by checking the gain or the phase difference of the maximum drive frequency directly, as a diagnosis function, it is possible to judge whether or not the deformable mirror 200 which is sealed is usable.

This structure differs from the structure in the first embodiment, and without having a need of the pressure sensor 120 apart from the deformable mirror, the deformable mirror 200 has its own diagnosis function. Therefore, the number of components is reduced, the structure is simplified, and the assembling becomes easy.

Figure 18:
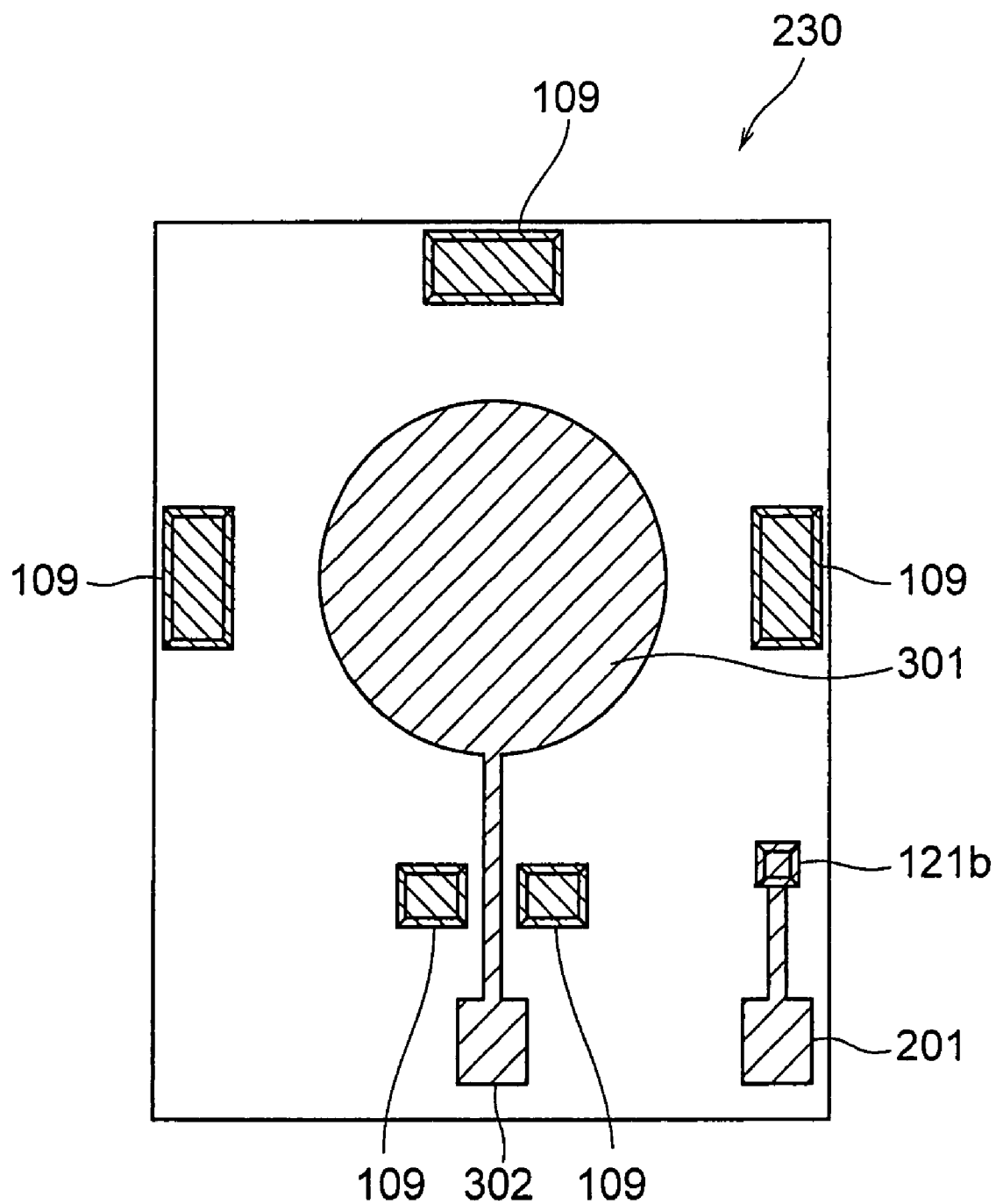
FIG. 18 is a diagram showing an electrode substrate in a deformable mirror of a modified embodiment of the second embodiment.
Figure 19:
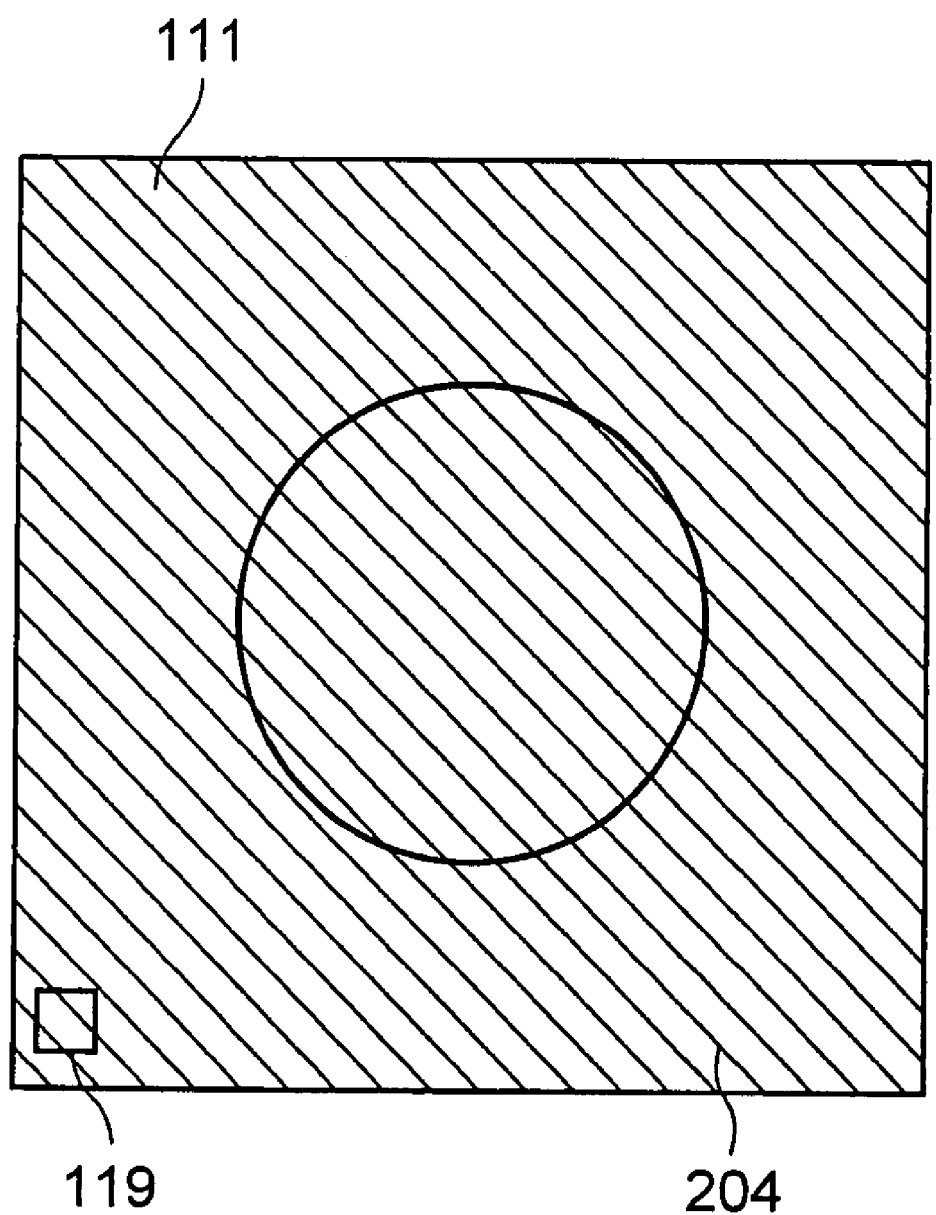
FIG. 19 is a diagram showing a mirror substrate in the deformable mirror of the modified embodiment of the second embodiment.

Various alternative constructions and modifications can be made in each structure of the embodiments of the present invention. As in a deformable mirror 230 shown in FIG. 18 and FIG. 19, the structure may be such that one single component serves both as the capacitive sensor electrode 203 and the drive electrode 112.

Figure 20:
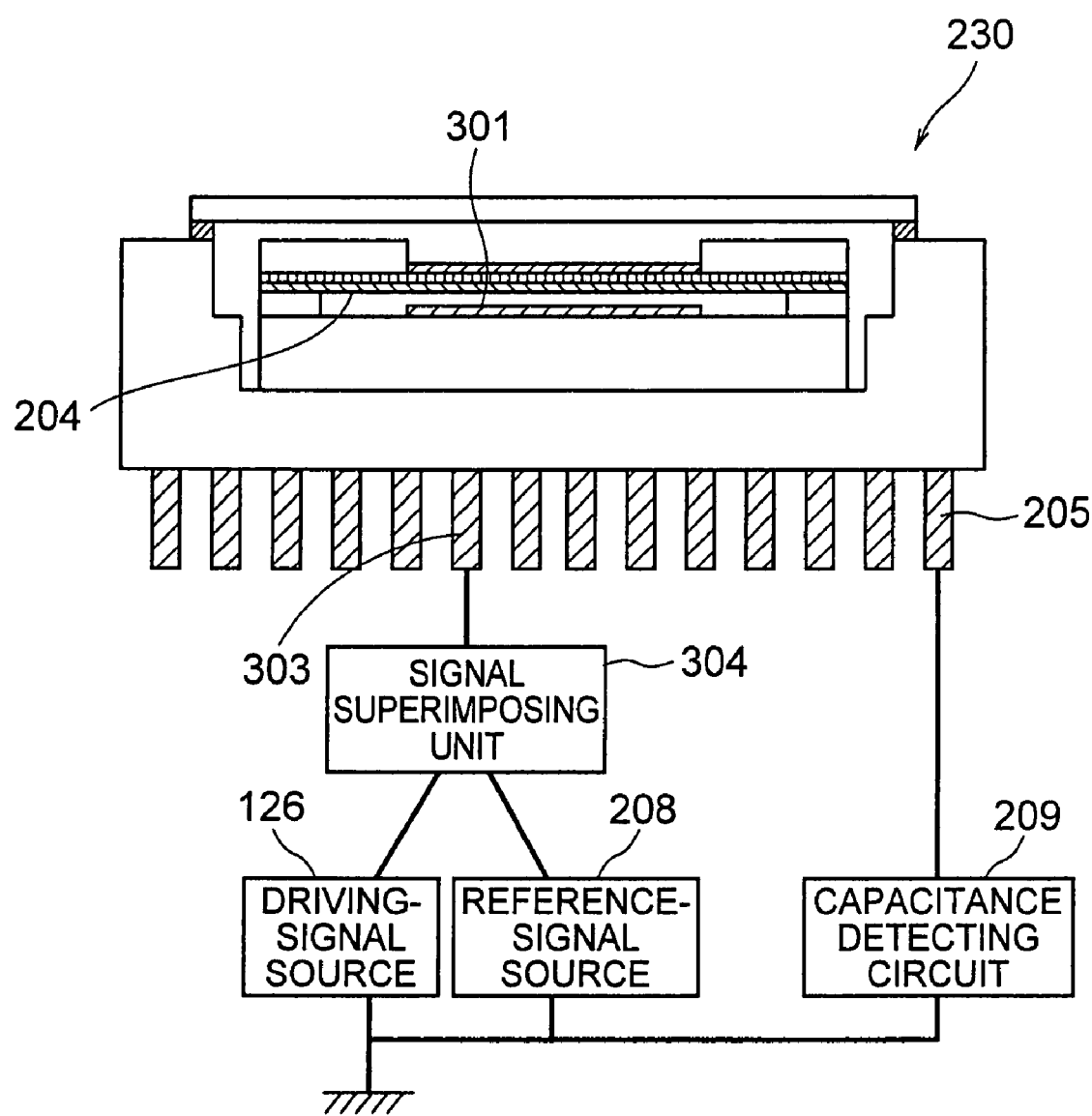
FIG. 20 is a basic circuit structure diagram of the deformable mirror according to the modified embodiment of the second embodiment.

In this case, the drive electrode 112 is used as a drive cum capacitive sensor electrode 301. The structure of the deformable mirror 230 is same as a structure shown in the first embodiment excluding the pressure sensor 120. Examples of a capacitance detecting means in this structure are shown in FIG. 20 (deformable mirror 230) and FIG. 21 (deformable mirror 240). Furthermore, a structure in which a drive waveform and a phase difference of the vibration waveform of the deformable section 104 are detected by using the phase-difference detecting circuit 212 is shown in FIG. 22 (deformable mirror 250).

Figure 21:
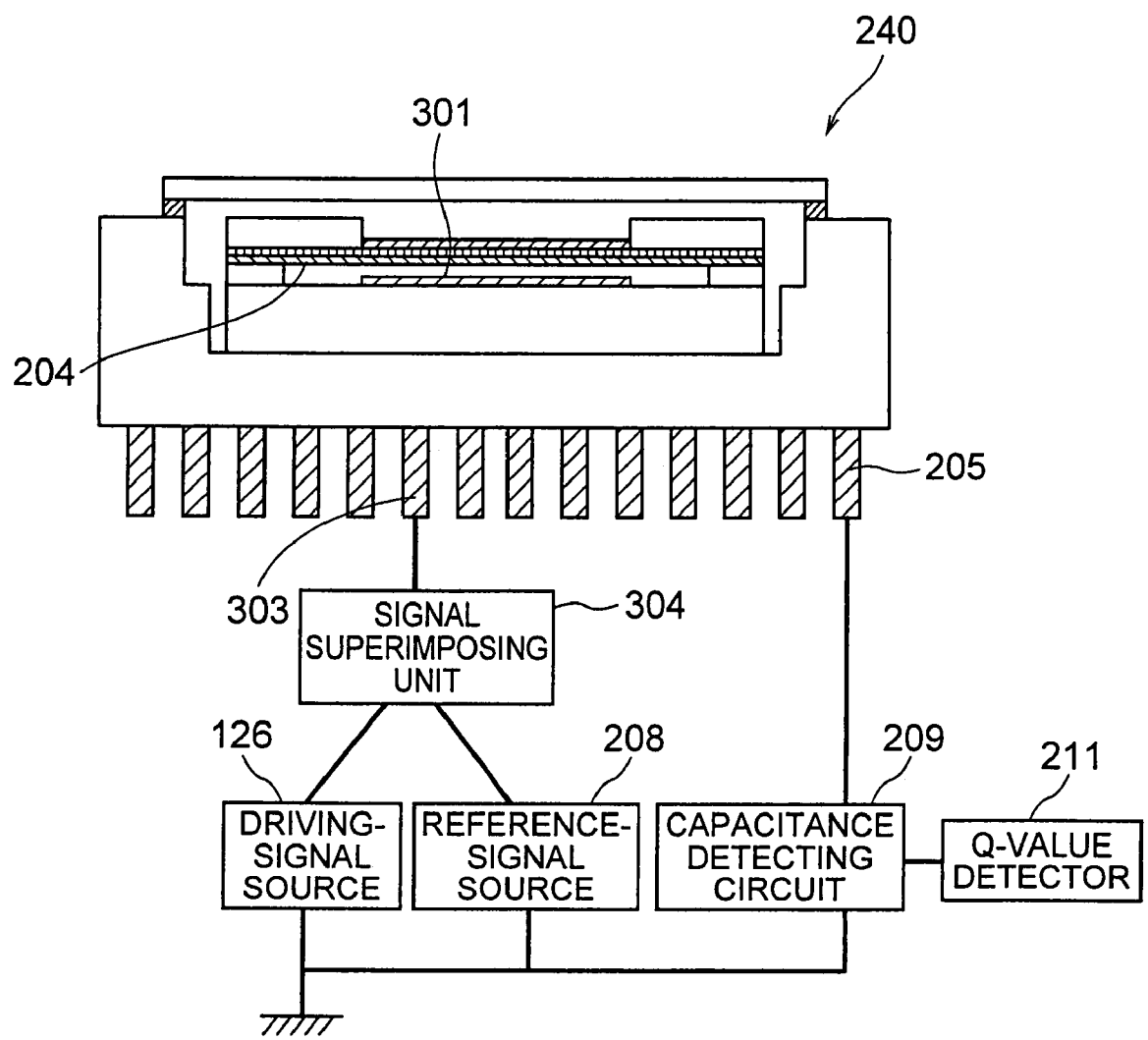
FIG. 21 is another basic circuit structure diagram of the deformable mirror according to the modified embodiment of the second embodiment.
Figure 22:
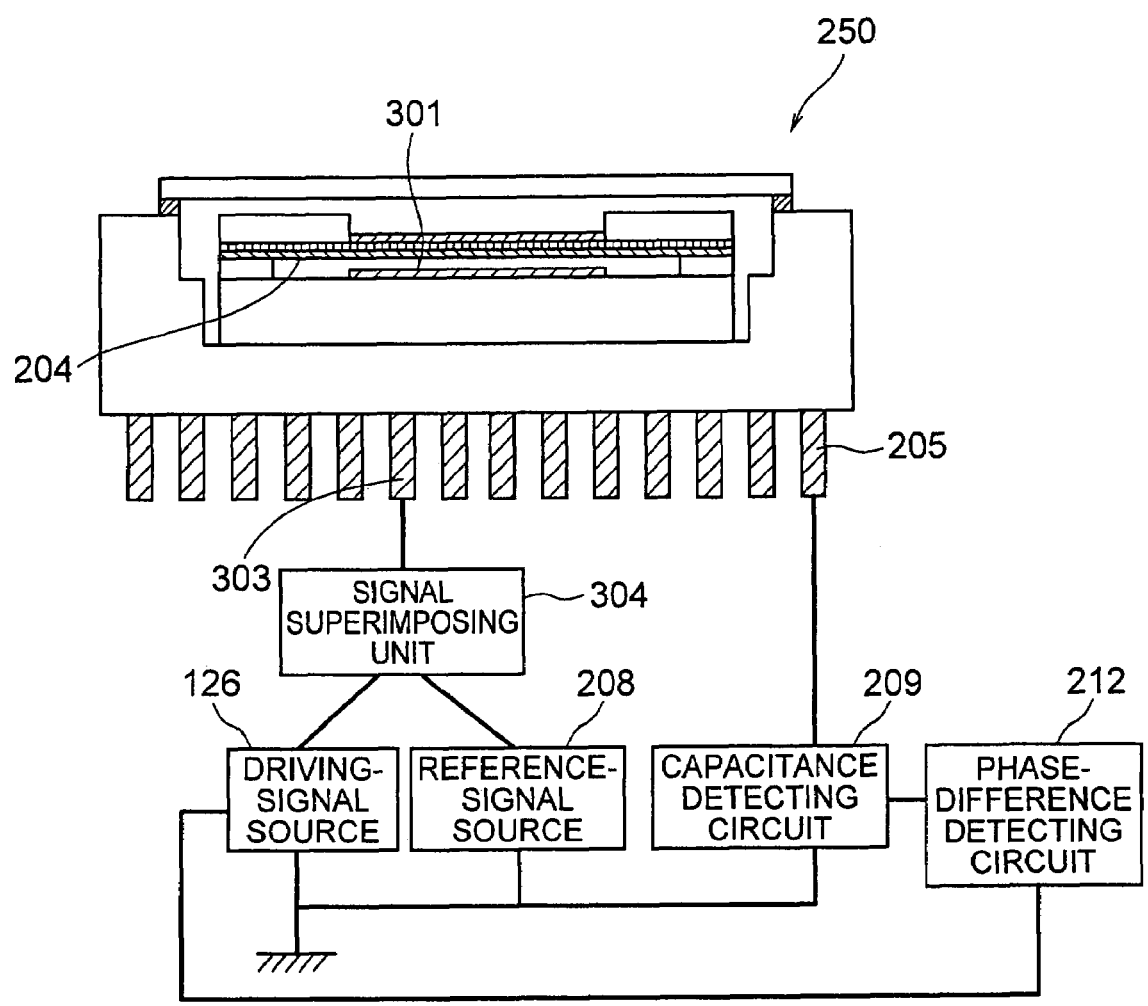
FIG. 22 is a still another basic structure diagram of the deformable mirror according to the modified embodiment of the second embodiment.
Figure 23A:
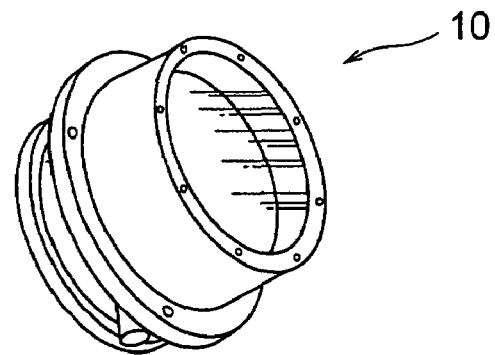
FIG. 23A and FIG. 23B are external views of a conventional deformable mirror.
Figure 23B:
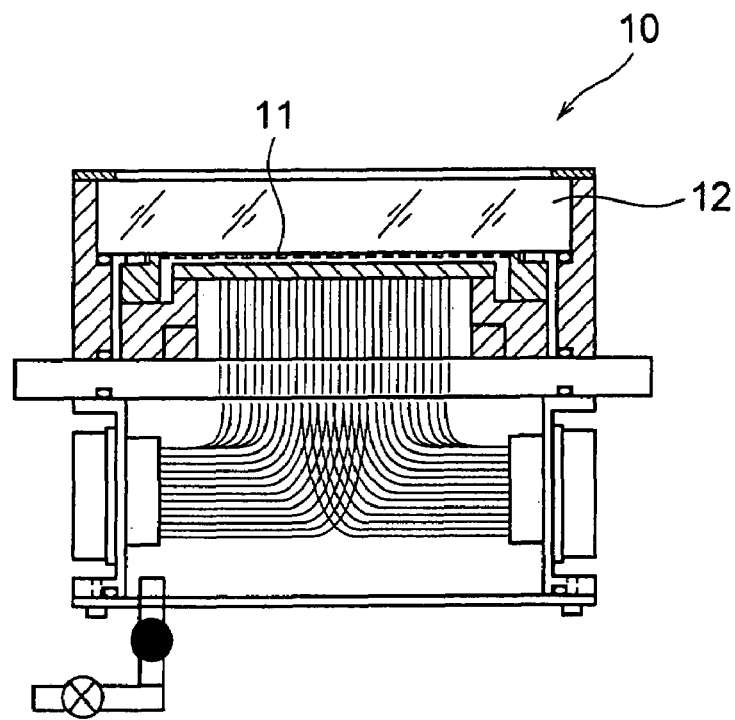
Figure 24:
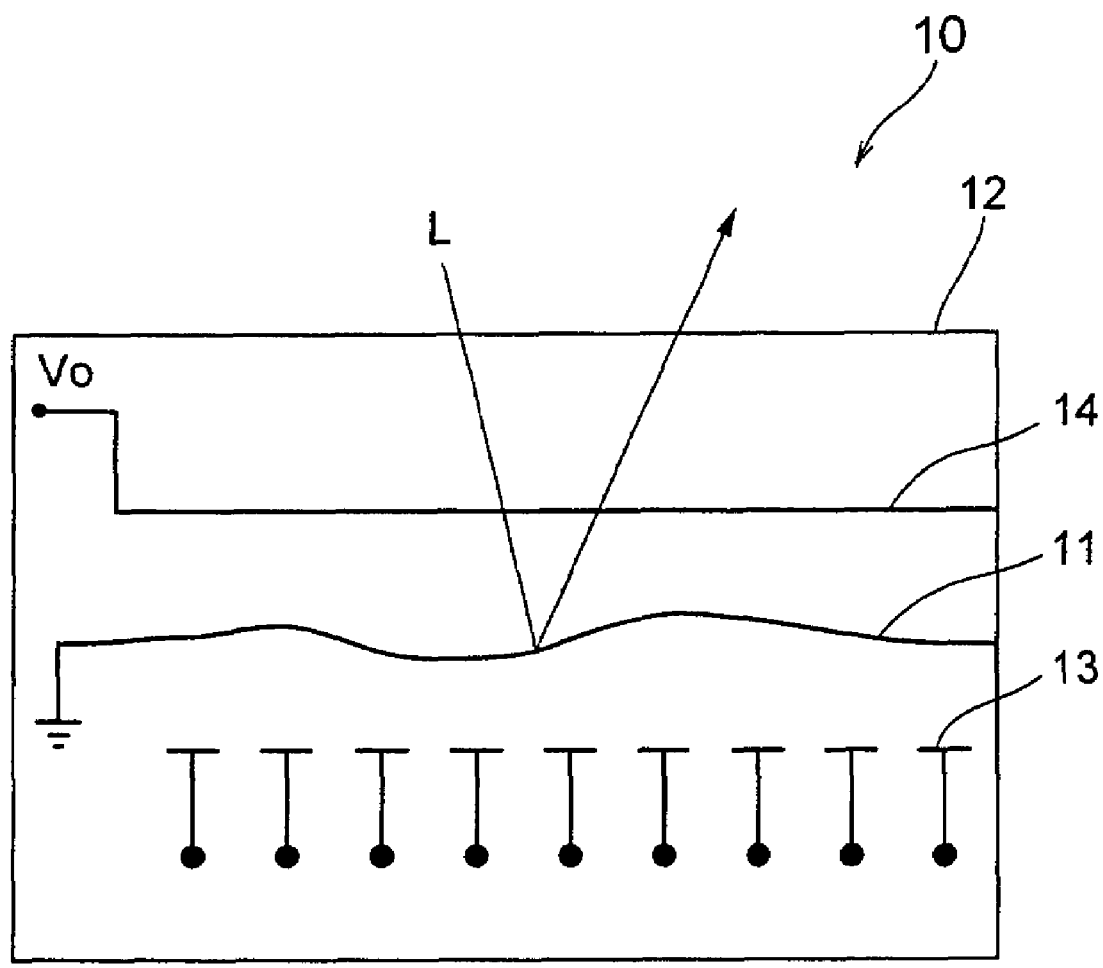
FIG. 24 is a diagram which describes a driving system of the conventional deformable mirror.

In any of the structures shown in FIG. 20, FIG. 21, and FIG. 22, a signal superimposing unit 304 is connected to a drive cum capacitive sensor electrode pin 303 which is electrically connected to the drive cum capacitive sensor electrode 301. The reference-signal source 208 and the driving-signal source 126 are connected to the signal superimposing unit 304. The signal superimposing unit 304 is used for forming a superimposed signal in which the driving signal and the reference signal are superimposed.

The capacitance detecting circuit 209 is connected to the COM electrode pin 205 which is electrically connected to the COM electrode 204 formed on the mirror substrate 111. The reference signal is superimposed on the driving signal and reaches the drive electrode 112. Consequently, the vibration detector in this structure includes the reference-signal source 208, the drive cum capacitive sensor electrode 301, the COM electrode 204, and the capacitance detecting circuit 209.

A reference-signal component of the superimposed signal changes based on a change in the capacitance between the COM electrode 204 and the drive cum capacitive sensor electrode 301, and becomes an output signal. The output signal reaches the capacitance detecting circuit 209 which is connected to the COM electrode pin 205, through the COM electrode 204. The capacitance detecting circuit 209 can detect the capacitance between the COM electrode 204 and the drive cum capacitive sensor electrode 301, based on the output signal.

In a case of monitoring the response of the deformable section 104 from the Q value at the time of resonant vibration of the deformable section 104, the structure may be made such that as in FIG. 21, the Q-value detector 211 is connected to the capacitance detecting circuit 209. Furthermore, in a case of monitoring the response of the deformable section 104 from the phase difference, the structure may be made such that as in FIG. 22, the phase-difference detecting circuit 212 is connected to the capacitance detecting circuit 209.

In an action-effect of this modified embodiment, points of similarity with the second embodiment are omitted. However, unlike in the second embodiment, since it is not necessary to provide the capacitive sensor electrode 203, it is possible to form the drive electrode 112 on the entire deformable section 104. Therefore, it is possible to generate a driving force on the entire surface of the deformable section. As a result, the deformable section 104 is capable of taking a desired deformed shape.

Third Embodiment

Next, the deformable mirror 200 according to a third embodiment of the present invention will be described below. Same reference numerals are assigned to components which are similar as in the first embodiment and the second embodiment, and the description to be repeated is omitted.

Figure 25:
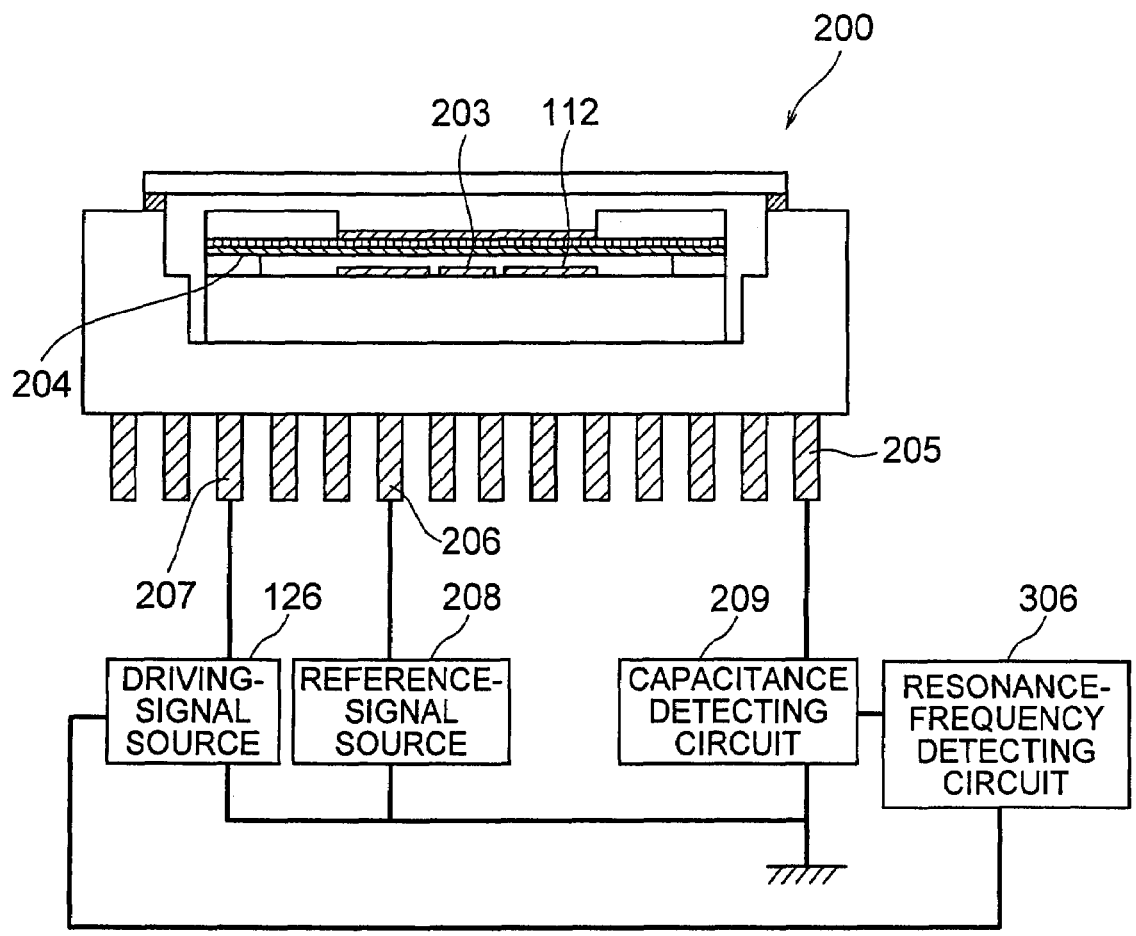
FIG. 25 is a basic circuit-structure diagram of a deformable mirror according to a third embodiment.

FIG. 25, unlike a structure of the deformable mirror 200 which includes the vibration detector shown in FIG. 13, shows a structure in which a resonance-frequency detecting circuit 306 is further connected to the capacitance detecting circuit. The resonance-frequency detecting circuit 306 is also connected to the driving-signal source 126. There are following two main types A and B of a concept of detection by the resonance-frequency detecting circuit 306.

A. A type in which, a frequency for which, the amplitude value of the deformable section becomes the maximum, is detected.

B. A type in which, a frequency for which, a phase difference between the drive waveform and the vibration waveform becomes 90 degree, is detected.

In A type, there are two detection methods. A first detection method is a method in which, as shown in FIG. 26A, the drive frequency is swept in an area (sweeping area) which includes the resonance frequency, and after the sweeping, the frequency for which the amplitude value of the deformable section 104 becomes the maximum is determined.

A second detection method is a method in which, as shown in FIG. 26B, the drive frequency is swept in steps in an area which includes the resonance frequency, then at each step, previous and subsequent amplitude values of the deformable section 104 are measured, and then a frequency at the previous step at which the amplitude value in the subsequent step became less than the amplitude value of the previous step is let to be the resonance frequency.

In the method shown in FIG. 26B, further, an interval between the steps of the drive frequency is reduced, and the similar detection is performed by reversing a sweeping direction. By repeating this, it is possible to improve an accuracy of the resonance frequency.

The method in B type mentioned above, as shown in FIG. 26C and FIG. 26D, is a method of determining by letting the phase of the vibration waveform and the driving waveform to be detected instead of the amplitude value in the A type.

Figure 27:
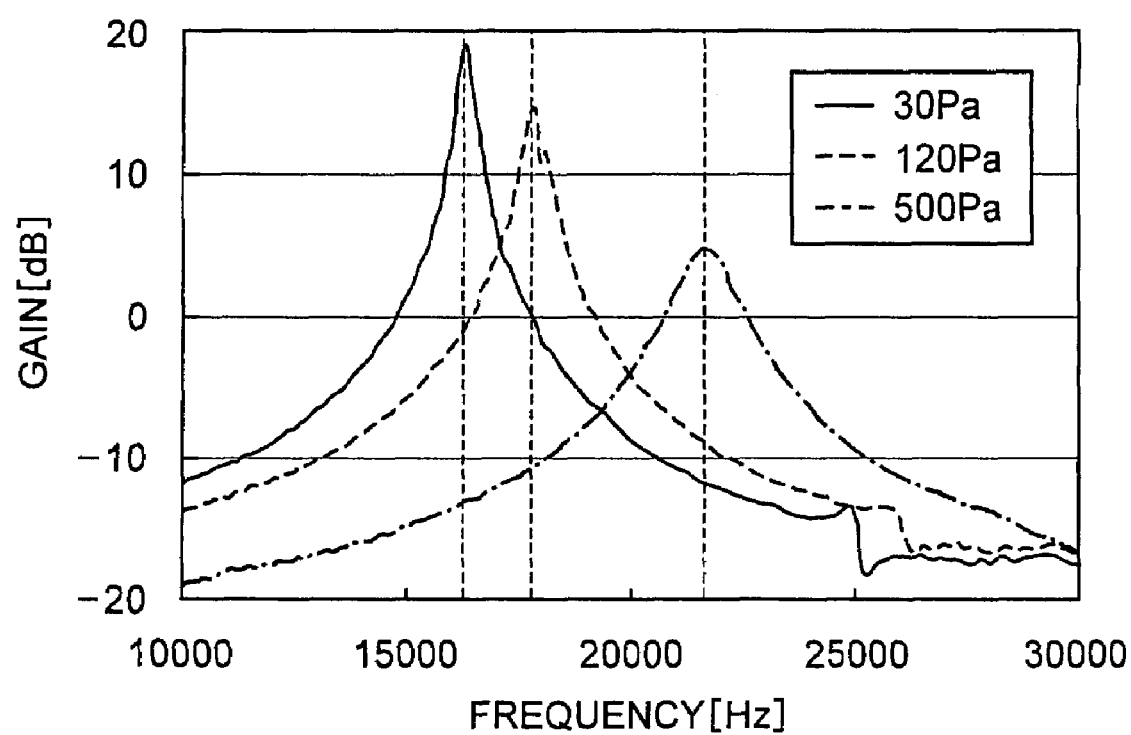
FIG. 27 is a diagram showing the pressure in the sealed-inside, and the frequency characteristics of the deformable section.

FIG. 27 shows a result when the resonance frequency is calculated by sweeping the drive frequency while changing the pressure in the sealed-inside, based on the method mentioned above. The resonance frequency is a frequency at which the drive gain of the deformable section 104 becomes the maximum. The resonance frequency shifts to a direction in which the resonance frequency is increased with the increase in the pressure.

Figure 28:
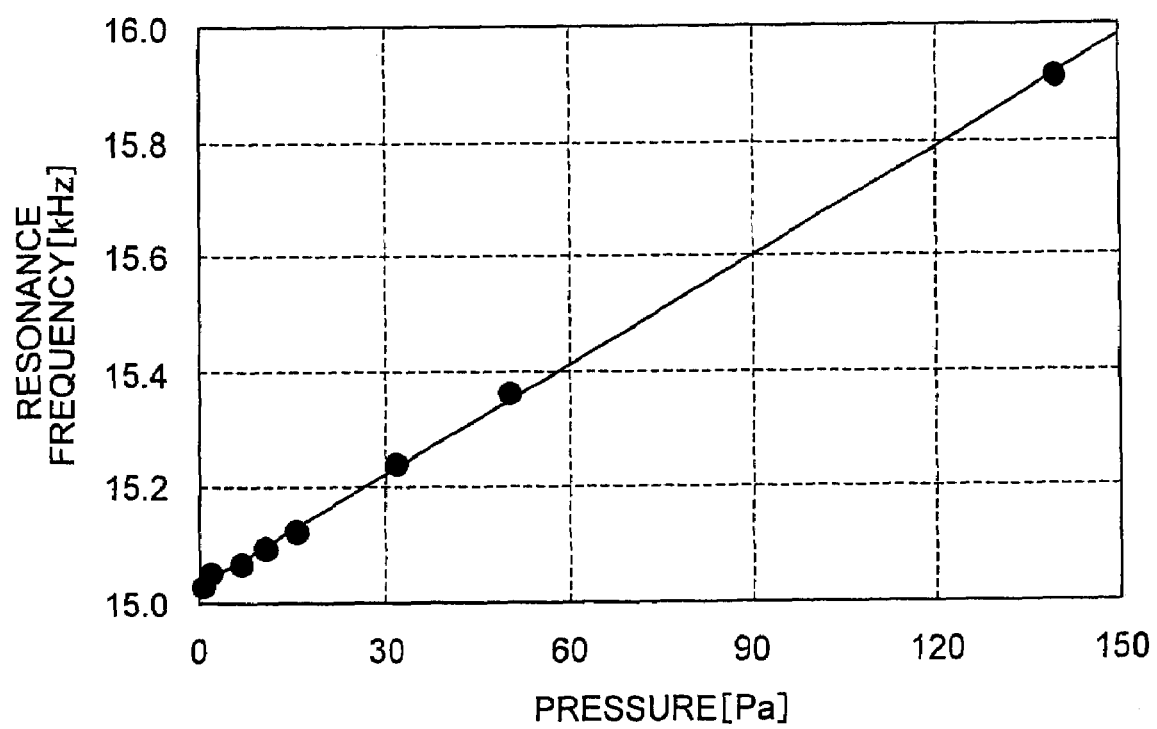
FIG. 28 is a diagram showing a relationship between the pressure in the sealed-inside and a resonance frequency.

FIG. 28 shows a graph in which a horizontal axis indicates the pressure and the resonance frequency is taken on a vertical axis. As shown in the first embodiment, the optimum pressure range of the sealed-inside is about 1 Pa to 1000 Pa. However, the pressure range depends on the amount of gap, and in a structure shown in FIG. 28, the pressure range is shown as 1 Pa to 150 Pa.

As it is evident from the diagram, the pressure and the resonance frequency are correlated in this pressure range, and it is possible to find the resonance frequency of the deformable section 104, and consequently to monitor the change in the response of the deformable section 104.

Figure 29:
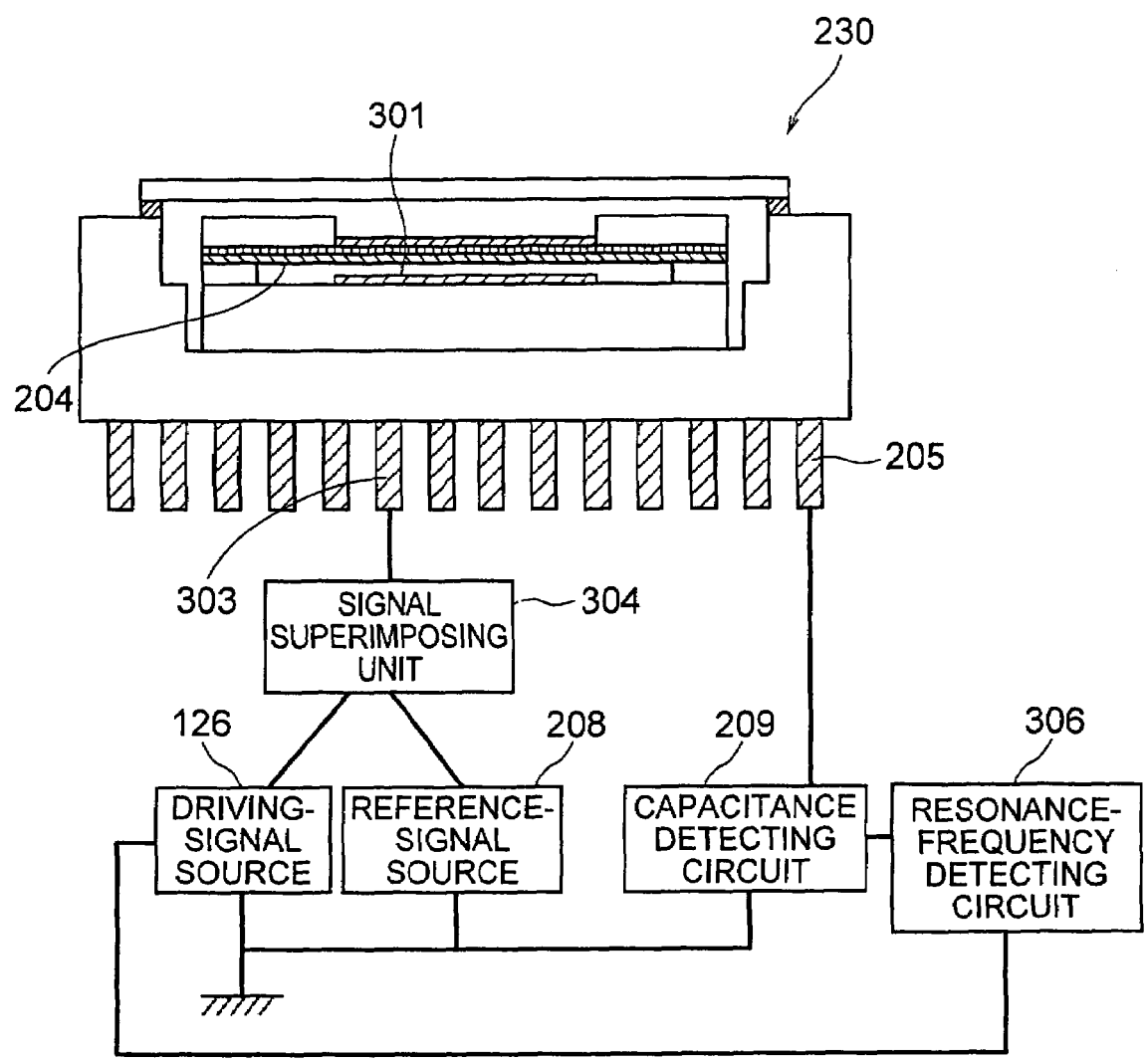
FIG. 29 is a basic circuit structure diagram of a deformable mirror according to a modified embodiment of the third embodiment.

Various alternative constructions and modifications can be made in each structure of the embodiments of the present invention. As in the deformable mirror 230 shown in FIG. 29, even in a structure in which one single component serves both as the capacitive sensor electrode and the drive electrode, the response of the deformable section 104 may be monitored by detecting the resonance frequency by using the resonance-frequency detecting circuit 306. The structure shown in FIG. 29 is basically similar to the structure shown in FIG. 20, and the resonance-frequency detecting circuit 306 is connected to the capacitance detecting circuit 209 and the driving-signal source 126.

In an action-effect of this modified embodiment, points of similarity with the second embodiment are omitted. As it is shown in FIG. 28, the pressure and the resonance frequency have a linear relationship, and it is possible to monitor the change in the response of the deformable section 104 with a constant sensitivity without depending on the pressure.

Figure 30:
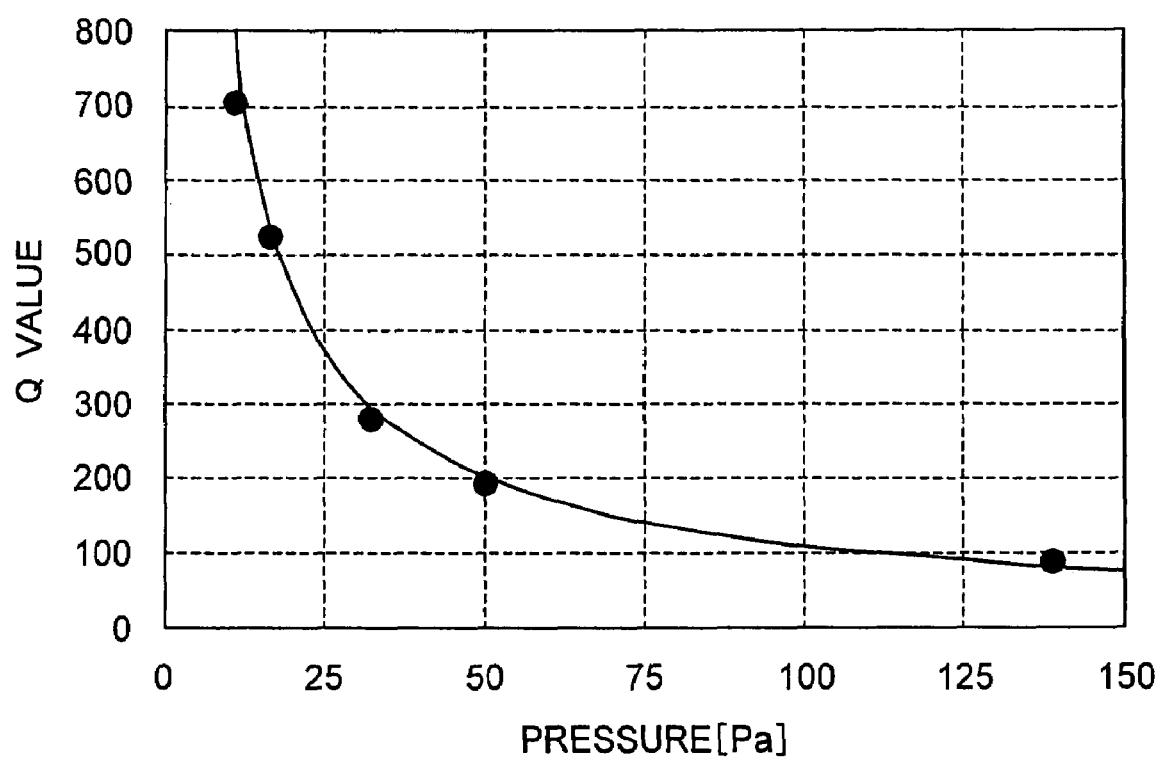
FIG. 30 is a diagram showing the relationship between the pressure in the sealed-inside and the Q value.

A case of monitoring the change in the response of the deformable section 104 in accordance with the Q value has a characteristic that since the relationship between the resonance frequency and the pressure is linear, unlike a non-linear relationship between the Q value and the pressure as shown in FIG. 30, monitoring is possible in a wide pressure range.

When the pressure range is lower than 50 Pa, monitoring with the Q value has a detection sensitivity higher than by monitoring with the resonance frequency. Moreover, since the Q value is determined by detecting the resonance frequency for this detection, and a frequency at a point where the amount of deformation of the deformable section is reduced by 3 dB in a direction of increase or decrease in the resonance frequency, there are three points at which the measurement is performed. Whereas, monitoring of the change in the response due to the resonance frequency is measuring the resonance frequency at only one point. Therefore, in the monitoring of the change in the response due to the resonance frequency, it is possible to simplify a detection algorithm than in the monitoring by the Q value, and to simplify the detecting circuit.

An effect is shown that the deformable mirror of the present invention performs a self diagnosis of a change in the response associated with a change in the pressure of a deformable section which is sealed.

Thus, the deformable mirror according to the present invention is useful as a deformable mirror in which a shape of a reflecting surface changes continuously.

What is claimed is:

1. A deformable mirror comprising:
    a deformable section on which, a reflecting surface is formed;
    a fixing section which fixes an outer periphery of the deformable section;
    a first electrode which is formed on the deformable section;
    a second electrode which is provided facing the first electrode; and
    a driving-signal source which deforms the deformable section by a voltage applied between the first electrode and the second electrode, wherein
    the deformable mirror is sealed such that a pressure inside to be lower than an atmospheric pressure, and further comprising:
    a monitoring section which detects a change in response characteristics of the deformable section, associated with a pressure change in a sealed-inside.

2. The deformable mirror according to claim 1, wherein
the monitoring section includes a vibration detector which detects a vibration waveform of the deformable section which vibrates, and at least a part of which is provided on the deformable section, and
a change in an amplitude of deformation of the deformable section is detected by the vibration detector, and
the response characteristics of the deformable section are monitored based on a relationship between a pressure and the amplitude of deformation.

3. The deformable mirror according to claim 2, wherein
the monitoring section includes a Q-value detector which detects a Q value when the deformable section undergoes resonant vibration, and
the response characteristics of the deformable section are monitored based on a relationship between the pressure and the Q value.

4. The deformable mirror according to claim 2, wherein
the monitoring section includes a phase-difference detecting circuit which detects a phase difference between the vibration waveform of the deformable section obtained by the vibration detector, and a driving signal which is output from the driving-signal source, and
the response characteristics of the deformable section are monitored based on a relationship between the pressure and the phase difference.

5. The deformable mirror according to claim 2, wherein
the monitoring section includes a resonance-frequency detector which detects a resonance frequency when the deformable section undergoes resonant vibration, and
the response characteristics of the deformable section are monitored based on a relationship between the pressure and the resonance frequency.

6. The deformable mirror according to one of claims 2 to 5, wherein
the vibration detector is a capacitance detector which detects a capacitance between the first electrode and the second electrode.

7. The deformable mirror according to one of claims 2 to 5, wherein
the vibration detector includes a third electrode which is provided facing the first electrode, and
the vibration detector is a capacitance detector which detects a capacitance between the first electrode and the third electrode.

8. A deformable mirror comprising:
a deformable section on which, a reflecting surface is formed;
a fixing section which fixes an outer periphery of the deformable section;
a first electrode which is formed on the deformable section;
a second electrode which is provided facing the first electrode; and
a driving-signal source which deforms the deformable section by a voltage applied between the first electrode and the second electrode, wherein
the deformable mirror is sealed such that a pressure inside lower than an atmospheric pressure, and further comprising;
a pressure sensor which detects a pressure in a sealed-inside.

* * * * *